(12) United States Patent
Alvarez et al.

(10) Patent No.: US 12,269,533 B2
(45) Date of Patent: *Apr. 8, 2025

(54) METHOD FOR PRODUCING A WELDED STEEL BLANK AND ASSOCIATED WELDED BLANK

(71) Applicant: ArcelorMittal, Luxembourg (LU)

(72) Inventors: Cristian Alvarez, Fitz-James (FR); Thierry Lizon, Bury (FR); Maria Poirier, Villers-Saint-Paul (FR)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,472

(22) Filed: Aug. 16, 2023

(65) Prior Publication Data

US 2023/0399051 A1 Dec. 14, 2023

Related U.S. Application Data

(63) Continuation of application No. 16/766,725, filed as application No. PCT/IB2018/059288 on Nov. 26, 2018, now Pat. No. 11,945,503.

(30) Foreign Application Priority Data

Nov. 24, 2017 (WO) .................. PCT/IB2017/057386

(51) Int. Cl.
*B23K 26/60* (2014.01)
*B21D 22/02* (2006.01)
(Continued)

(52) U.S. Cl.
CPC ........... *B62D 21/15* (2013.01); *B21D 22/022* (2013.01); *B23K 26/0006* (2013.01);
(Continued)

(58) Field of Classification Search
CPC .... B23K 26/0006; B23K 26/24; B23K 26/60; B23K 33/00; B23K 35/24; B23K 2101/185; C22C 38/02; C22C 38/04; C22C 38/06
See application file for complete search history.

(56) References Cited

U.S. PATENT DOCUMENTS 9,611,517 B2 4/2017 Laurent et al.
10,471,544 B2 11/2019 Anderson et al.
(Continued)

FOREIGN PATENT DOCUMENTS

CN 106794533 A 5/2017
DE 102015115915 A1 3/2017
(Continued)

OTHER PUBLICATIONS

J.R. Regina et al: "The Effect of Chromium on the Weldability and Microstructure of Fe—Cr—Al Weld Cladding", Welding Research, Jun. 2007, vol. 86, pp. 1-9.
(Continued)

*Primary Examiner* — Nicholas A Wang
*Assistant Examiner* — Maxwell Xavier Duffy
(74) *Attorney, Agent, or Firm* — Davidson Kappel LLC

(57) ABSTRACT

A method for producing a welded blank (1) includes providing two precoated sheets (2), butt welding the precoated sheets (2) using a filler wire. The precoating (5) entirely covers at least one face (4) of each sheet (2) at the time of butt welding. The filler wire (20) has a carbon content between 0.01 wt. % and 0.45 wt. %. The composition of the filler wire (20) and the proportion of filler wire (20) added to the weld pool is chosen such that the weld joint (22) has (a) a quenching factor $FT_{WJ}$: $FT_{WJ} - 0.9 FT_{BM} \geq 0$, where $FT_{BM}$ is a quenching factor of the least hardenable substrate (3), and $FT_{WJ}$ and $FT_{BM}$ are determined: $FT = 128 + 1553 \times C +$
(Continued)

$55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, and (b) a carbon content $C_{WJ}<0.15$ wt. % or, if $C_{WJ}\geq 0.15$ wt. %, a softening factor $FA_{WJ}$ such that $FA_{WJ}>5000$, where $FA=10291+4384.1\times Mo+3676.9\times Si-522.64\times Al-2221.2\times Cr-118.11\times Ni-1565.1\times C-246.67\times Mn$.

38 Claims, 3 Drawing Sheets

(51) Int. Cl.
| | |
|---|---|
| B23K 26/00 | (2014.01) |
| B23K 26/24 | (2014.01) |
| B23K 33/00 | (2006.01) |
| B23K 35/24 | (2006.01) |
| B23K 35/38 | (2006.01) |
| B62D 21/15 | (2006.01) |
| B62D 27/02 | (2006.01) |
| C21D 6/00 | (2006.01) |
| C21D 9/50 | (2006.01) |
| C22C 19/05 | (2006.01) |
| C22C 30/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/26 | (2006.01) |
| C22C 38/28 | (2006.01) |
| C22C 38/32 | (2006.01) |
| C22C 38/38 | (2006.01) |
| B23K 101/00 | (2006.01) |
| B23K 101/18 | (2006.01) |

(52) U.S. Cl.
CPC .............. *B23K 26/24* (2013.01); *B23K 26/60* (2015.10); *B23K 33/00* (2013.01); *B23K 35/24* (2013.01); *B23K 35/383* (2013.01); *B62D 27/02* (2013.01); *C21D 6/002* (2013.01); *C21D 6/005* (2013.01); *C21D 6/008* (2013.01); *C21D 9/505* (2013.01); *C22C 19/057* (2013.01); *C22C 30/02* (2013.01); *C22C 38/002* (2013.01); *C22C 38/02* (2013.01); *C22C 38/04* (2013.01); *C22C 38/06* (2013.01); *C22C 38/26* (2013.01); *C22C 38/28* (2013.01); *C22C 38/32* (2013.01); *C22C 38/38* (2013.01); *B23K 2101/006* (2018.08); *B23K 2101/185* (2018.08)

(56) References Cited

U.S. PATENT DOCUMENTS

| | | | |
|---|---|---|---|
| 10,697,486 B2 | 6/2020 | Maruyama et al. | |
| 10,828,729 B2 | 11/2020 | Cretteur et al. | |
| 11,154,950 B2 | 10/2021 | Canourgues et al. | |
| 11,945,503 B2* | 4/2024 | Alvarez | B23K 26/24 |
| 2002/0043305 A1 | 4/2002 | Fairchild et al. | |
| 2009/0158889 A1 | 6/2009 | Kodama et al. | |
| 2009/0220815 A1 | 9/2009 | Canourgues et al. | |
| 2010/0221572 A1 | 9/2010 | Laurent et al. | |
| 2014/0057128 A1 | 2/2014 | Canourgues et al. | |
| 2014/0154521 A1 | 6/2014 | Kown et al. | |
| 2015/0043962 A1 | 2/2015 | Miyazaki et al. | |
| 2016/0144456 A1 | 5/2016 | Kim | |
| 2017/0298470 A1 | 10/2017 | Zeniya et al. | |
| 2017/0350434 A1 | 12/2017 | Maruyama et al. | |
| 2018/0326538 A1 | 11/2018 | Breuer et al. | |
| 2019/0285102 A1 | 9/2019 | Canourgues et al. | |
| 2021/0214816 A1 | 7/2021 | Cobo et al. | |

FOREIGN PATENT DOCUMENTS

| | | |
|---|---|---|
| EP | 2007545 B1 | 7/2009 |
| EP | 2737971 A1 | 6/2014 |
| EP | 2942143 A1 | 11/2015 |
| EP | 2975150 A1 | 1/2016 |
| JP | H08276286 A | 10/1996 |
| JP | H0941125 A | 2/1997 |
| JP | 2006219741 A | 8/2006 |
| JP | 2013204090 A | 10/2013 |
| JP | 2013220445 A | 10/2013 |
| JP | 2014012890 A | 1/2014 |
| JP | 2017189781 A | 10/2017 |
| KR | 1020090005004 A | 5/2009 |
| KR | 20160033541 A | 3/2016 |
| KR | 1020170009868 A | 1/2017 |
| KR | 1020170029012 A | 3/2017 |
| KR | 1020170068531 A | 6/2017 |
| RU | 2410221 C2 | 1/2011 |
| RU | 2594766 C9 | 12/2016 |
| WO | WO2007118939 A1 | 10/2007 |
| WO | WO07125182 | 11/2007 |
| WO | WO08132303 | 11/2008 |
| WO | WO2014075824 A1 | 5/2014 |
| WO | WO14088170 | 6/2014 |
| WO | WO2015086781 A1 | 6/2015 |
| WO | WO2015150892 A1 | 10/2015 |
| WO | WO17050711 | 3/2017 |

OTHER PUBLICATIONS

Hyeon-Jeong Shin et al: "Microstructure and Tensile Properties in LBW hybrid welded of Al—Si coated Boron steel with various composition Filler wire after Hot Stamping", UST 2013, PT 7-2, pp. 1.

Hyeon-Jeong Shin et al: "Microstructure and Tensile Properties in LBW hybrid welded of Al—Si coated Boron steel with various composition Filler wire after Hot Stamping", Proceedings of IJST 2013, Nov. 27-29, 2013, pp. 1-3.

Min-Seok Kwon et al: "Development of the New Technology for TWB and Hot Stamping Hybrid Process", 6th International Conference on Tube Hydroforming (Tubehydro 2013), Aug. 25-28, 2013, Jeju, Korea, pp. 1-9.

Myeong-Hwan Oh et al: "Effect of Hot-Stamping on Microstructure and Tensile Properties of Al—Si Coated Boron Steel Welds and Laser Source", pp. 1-25.

Myeong-Hwan Oh et al: "Effect of Hot-Stamping on Mechanical Properties and Microstructure of $CO^2$ Laser Welded Boron Steel Coated with Al—Si Layer", pp. 1-22.

ArcelorMittal Acos Planos America Latina- Basil, Catalogo de Produtos Laminados I Edicao 2015, pp. 1-104.

Myeong-Hwan Oh et al: "Effect of Hot-Stamping on Mechanical Properties and Microstructure of $CO^2$ Laser Welded Boron Steel Coated with Al—Si Layer", pp. 1-12 English Translation.

Myeong-Hwan Oh et al: "Effect of Hot-Stamping on Microstructure and Tensile Properties of Al—Si Coated Boron Steel Welds and Laser Source", pp. 1-14 English Translation.

Third party submission (public opinion) filed in related Chinese patent application No. 201880075840.0 (with purported translation).

First Office Action dated May 17, 2021 issued in related Chinese patent application No. 201880075840.0 (with purported translation).

Amended claims filed on Sep. 26, 2021 in related Chinese patent application No. 201880075840.0 (with purported translation).

Second Office Action dated Sep. 29, 2021 issued in related Chinese patent application No. 201880075840.0 (with purported translation).

Amended claims and arguments filed on Oct. 27, 2021 in related Chinese patent application No. 201880075840.0 (with purported translation).

Third party observation filed in related European patent application No. 18814697.1.

Eguchi K, JP-2014012890-A description machine translation (2014).

(56) References Cited

OTHER PUBLICATIONS

Fujita N, JP-2006219741-A description machine translation (2006).
J.R. Davis, Steel Sheet, Strip, and Plate, 1998, ASM International, Metals Handbook Desk Edition $2^{nd}$ Edition, pp. 225-232 (1998).
S.L. Semiatin, Blanking of Low-Carbon Steel, 2006, ASM International, Metalworking: Sheet Forming, vol. 14B, pp. 144-155 (2006).

* cited by examiner

METHOD FOR PRODUCING A WELDED STEEL BLANK AND ASSOCIATED WELDED BLANK

This is a continuation of U.S. application Ser. No. 16/766,725 which has a filing date of May 25, 2020 and which is a national stage of PCT/IB2018/059288 filed Nov. 26, 2018 which claims priority to PCT/IB2017/057386 filed Nov. 24, 2017, the entire disclosures of which are hereby incorporated by reference herein.

The present invention relates to a method for producing a welded steel blank, to the thus obtained welded steel blank, to a method for producing a welded, hot press-formed and cooled steel part from the welded steel blank and to the thus obtained welded, hot press-formed and cooled steel part.

BACKGROUND

Methods for the fabrication of welded parts from steel sheets of different compositions and/or thicknesses that are butt-welded to one another are known from the prior art. More particularly, the welded blanks are usually heated to a temperature allowing the austenitization of the steel and are then hot-formed and cooled in the hot-press forming tool. The composition of the steel can be selected both to make subsequent heating and forming operations possible and to give the welded steel part high mechanical strength, high impact strength and good corrosion resistance.

Steel parts of this type are used in particular in the automobile industry, and more particularly for the fabrication of anti-intrusion parts, structural parts or parts that contribute to the safety of motor vehicles.

In order to prevent corrosion, the steel sheets are precoated with an aluminum-based precoating through hot-dip coating in an aluminum-containing bath. If the steel sheets are welded without any prior preparation, the aluminum-based precoating will be diluted with the steel substrate within the molten metal during the welding operation. In the range of aluminum contents of the precoating, two phenomena can then occur.

If the aluminum content in the molten metal is locally high, intermetallic compounds are formed in the weld joint, resulting from the dilution of a portion of the precoating in the molten metal and of the alloying which occurs during the subsequent heating of the weld joint before the hot forming step. These intermetallic compounds are sites where incipient cracking is most likely to occur.

Furthermore, the aluminum tends to increase the austenitization temperature (Ac3) of the weld joint, and this modification of the austenitic domain will be all the more important as the level of aluminum in the weld joint is high. In some cases, this may prevent the complete austenitization of the weld joint which should occur on heating prior to forming and is the first step required for hot stamping and obtaining a martensitic structure in the weld joint after hot-press forming and cooling.

Moreover, aluminum also has a detrimental effect on the quenchability of the weld joint, as it increases the critical cooling speed necessary to obtain martensitic or bainitic structures in the weld joint during cooling.

Consequently, it is no longer possible to obtain martensite or bainite during the cooling after the hot forming and the thus obtained weld joint will contain ferrite. The weld joint then exhibits a hardness and mechanical strength which are less than those of the two adjacent sheets and therefore constitutes the weakest area of the part.

Publication EP2007545 describes a solution which consists of removing the superficial layer of metallic alloy at the weld edge of the pre-coated steel sheets, which is intended to be incorporated at least partially into the weld metal zone. The removal can be performed by brushing or using a laser beam. The intermetallic alloy layer is preserved in order to guarantee the corrosion resistance and to prevent the phenomena of decarburization and oxidation during the heat treatment that precedes the forming operation. The effect of aluminum is then drastically reduced by a local elimination of the superficial layer of the coating.

However, the removal of the precoating is a supplementary step and therefore increases the production cost.

EP 2 737 971, US 2016/0144456 and WO 2014075824 try to overcome this issue by providing a method in which the precoated sheets are welded using a filler wire comprising austenite-stabilizing elements, such as carbon, manganese or nickel, with the aim of obtaining a fully martensitic structure in the weld joint, after hot press-forming and cooling, despite the presence of aluminum in the weld resulting from the melting of the precoating.

These methods are, however, not entirely satisfactory since they only deal with one of the problems relating to the presence of aluminum in the weld pool: the compensation of the austenitization temperature (Ac3) and, in some cases, the use of high carbon filler wires can induce segregations in the weld joint. Indeed, the inventors of the present disclosure have found that the methods disclosed in the above-mentioned documents do not allow obtaining satisfactory mechanical properties in the parts obtained after hot press-forming and cooling, in particular for aluminum contents greater than or equal to 0.7% by weight in the weld joint, and all the more so for aluminum contents greater than or equal to 2.1%. In particular, for such parts, there is a high risk of failure in the weld joint under tensile testing in the weld transverse direction.

The methods disclosed in WO 2015/086781 and EP 2 942 143 also deal with this issue and describe methods in which the precoated steel sheets are welded using particular welding methods with specific filler materials.

More particularly, WO 2015/086781 suggests using twin spot laser welding while supplying filler material in the form of a metal powder having the following composition, in weight percentage: C: 0-0.03 wt. %, Mo: 2.0-3.0 wt. %, Ni: 10-14 wt. %, Mn: 1.0-2.0 wt. %, Cr: 16-18 wt. % and Si: 0.0-1.0 wt. %, the rest being iron.

EP 2 942 143 suggests using hybrid laser/arc welding using an arc welding torch positioned in front of the laser beam, while supplying filler material in the form of a filler wire having the following composition: C: 0-0.3 wt. %, Mo: 0-0.4 wt. %, Ni: 6-20 wt. %, Mn: 0.5-7 wt. %, Cr: 5-22 wt. % and Si: 0-1.3 wt. %, Nb: 0-0.7 wt. %, the rest being iron.

SUMMARY

These methods are also not satisfactory. Indeed, the inventors of the present invention have observed that the use of the filler wires described therein results in a high risk of failure of the part after hot press-forming and cooling in the zone immediately adjacent to the weld.

Furthermore, the use of hybrid laser-arc welding is not desirable, since hybrid laser/arc welding does not allow reaching the same welding speeds as laser welding and therefore results in a decreased overall productivity of the process.

Moreover, powder addition is generally more difficult to implement in a large-scale industrial setting than filler wires.

All of the methods based on filler material addition mentioned here-before only specify chemical composition ranges for the filler material, and, since the welding parameters and conditions have an influence on the filler material rate, one single filler wire can induce very different chemical compositions in the weld joint. The description of the composition of the filler wire alone therefore appears not to be sufficient to solve the aforementioned problems.

An object of the present disclosure is therefore to provide a method for producing a welded steel blank from two such precoated sheets that allows obtaining, after hot press-forming and cooling, a part having satisfactory crash performance properties, even for relatively high aluminum contents in the weld joint, at relatively low cost.

For this purpose, it is desirable that the weld joint does not constitute the weakest zone of the part obtained after hot press-forming and cooling of the welded blank. Therefore, such a part should not fail in the weld joint or in the area adjacent to the weld joint corresponding to the Heat Affected Zone resulting from the welding operation, when subjected to tension in a direction perpendicular to the weld joint.

A method for producing a welded steel blank comprising the successive steps of:
  providing two precoated sheets, each precoated sheet comprising a steel substrate having a precoating on at least one of its main faces, the precoating comprising an intermetallic alloy layer comprising at least iron and aluminum and, optionally, a metallic alloy layer extending atop the intermetallic alloy layer, the metallic alloy layer being a layer of aluminum, a layer of aluminum alloy or a layer of aluminum-based alloy,
  butt welding the precoated sheets using a filler wire so as to form a weld joint at the junction between the precoated sheets, the precoating entirely covering at least one main face of each precoated sheet at the time of butt welding,
wherein:
said filler wire has a carbon content comprised between 0.01 wt. % and 0.45 wt. % (criterion C1),
the composition of the filler wire and the proportion of filler wire added to the weld pool is chosen in such a manner that the thus obtained weld joint is characterized by:
(a) a quenching factor $FT_{WJ}$ of the weld joint such that $FT_{WJ} - 0.9 FT_{BM} \geq 0$ (criterion C2),
  where:
    $FT_{BM}$ is the quenching factor of the least hardenable steel substrate among the steel substrates of the two precoated sheets, and
    the quenching factors $FT_{WJ}$ and $FT_{BM}$ are determined using the following formula: $FT = 128 + 1553 \times C + 55 \times Mn + 267 \times Si + 49 \times Ni + 5 \times Cr - 79 \times Al - 2 \times Ni^2 - 1532 \times C^2 - 5 \times Mn^2 - 127 \times Si^2 - 40 \times C \times Ni - 4 \times Ni \times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint in the case of $FT_{WJ}$ and the least hardenable substrate in the case of $FT_{BM}$, and
(b) a carbon content $C_{WJ}$ of the weld joint strictly smaller than 0.15 wt. % or, if the carbon content $C_{WJ}$ of the weld joint is greater than or equal to 0.15 wt. %, a softening factor $FA_{WJ}$ of the weld joint such that $FA_{WJ} > 5000$ (criterion C3), where the softening factor $FA_{WJ}$ of the weld joint is calculated as a function of the mean aluminum, chromium, nickel, molybdenum, carbon, manganese and silicon content of the weld joint, expressed in weight percent, using the following formula:

$FA = 10291 + 4384.1 \times Mo + 3676.9 \times Si - 522.64 \times Al - 2221.2 \times Cr - 118.11 \times Ni - 1565.1 \times C - 246.67 \times Mn$.

According to particular embodiments, the method may comprise one or more of the following features, taken alone or according to any technically possible combination:
  the carbon content $C_{WJ}$, in weight percent, of the weld joint is such that $1.25 \times C_{BM(most\ hardenable)} - C_{WJ} \geq 0$ (criterion C4), where $C_{BM}$ is the carbon content, in weight percent, of the most hardenable substrate among the substrates of the two precoated sheets.
  the nickel content $Ni_{WJ}$ of the weld joint is comprised between 2.0 wt. % and 11.0 wt. % (criterion C5),
  the precoated sheets provided in the provision step have a precoating on both of their main faces,
  at the time of butt welding, the precoating remains integrally on both main faces of at least one of the precoated sheets, and preferably the two precoated sheets,
  the method further comprises, prior to butt welding, preparing a weld edge of at least one of the precoated sheets which is intended to be incorporated at least partially into the weld joint, using at least one of the following processing steps: brushing, machining, chamfering, bevelling and/or removing at least a portion of the precoating, whereby the preparation is performed in such a manner that the precoating remains integrally on at least one main face of each of the two precoated sheets,
  the welding step is performed using a laser beam,
  for at least one of the precoated sheets, the steel of the substrate comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ the rest being iron and impurities resulting from manufacturing,
  for at least one of the precoated sheets, the steel of the substrate comprises, by weight:

$0.15\% \leq C \leq 0.25\%$ $0.8\% \leq Mn \leq 1.8\%$ $0.1\% \leq Si \leq 0.35\%$ $0.01\% \leq Cr \leq 0.5\%$ $Ti \leq 0.1\%$ $Al \leq 0.1\%$ $S \leq 0.05\%$

P≤0.1%

B≤0.005% the rest being iron and impurities resulting from manufacturing,
for at least one of the precoated sheets, the steel of the substrate comprises, by weight:

0.040%≤C≤0.100%

0.80%≤Mn≤2.00%

Si≤0.30%

S≤0.005%

P≤0.030%

0.010%≤Al≤0.070%

0.015%≤Nb≤0.100%

Ti≤0.080%

N≤0.009%

Cu≤0.100%

Ni≤0.100%

Cr≤0.100%

Mo≤0.100%

Ca≤0.006%, the rest being iron and impurities resulting from manufacturing,
for at least one of the precoated sheets, the steel of the substrate comprises, by weight:

0.24%≤C≤0.38%

0.40%≤Mn≤3%

0.10%≤Si≤0.70%

0.015%≤Al≤0.070%

0%≤Cr≤2%

0.25%≤Ni≤2%

0.015%≤Ti≤0.10%

0%≤Nb≤0.060%

0.0005%≤B≤0.0040%

0.003%≤N≤0.010%

0.0001%≤S≤0.005%

0.0001%≤P≤0.025% wherein the titanium and nitrogen contents satisfy the following relationship

Ti/N>3.42.

and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:

0.05%≤Mo≤0.65%

0.001%≤W≤0.30%%

0.0005%≤Ca≤0.005% the rest being iron and impurities inevitably resulting from manufacturing, and
the welding is performed using a protection gas, in particular helium and/or argon.

A method is also provided for producing a welded, hot press-formed and cooled steel part comprising the successive steps of:
carrying out the method as described above in order to obtain a welded steel blank;
heating the welded steel blank so as to obtain a fully austenitic structure in the substrates of the precoated sheets;
hot press-forming the welded steel blank in a press tool to obtain a steel part; and
cooling the steel part in the press tool.

According to a particular embodiment of the method for producing the welded, hot press-formed and cooled steel part, during the cooling step, the cooling rate is greater than or equal to the bainitic or martensitic cooling rate of the most hardenable among the substrates of the precoated sheets.

A welded steel blank is also provided comprising two precoated sheets, each precoated sheet comprising a steel substrate having a precoating on at least one of its main faces, the precoating comprising an intermetallic alloy layer comprising at least iron and aluminum and, optionally, a metallic alloy layer extending atop the intermetallic alloy layer, the metallic alloy layer being a layer of aluminum, a layer of aluminum alloy or a layer of aluminum-based alloy, the precoated sheets being joined by a weld joint, the weld joint being characterized by:
(a) a quenching factor $FT_{WJ}$ of the weld joint such that $FT_{WJ} - 0.9 FT_{BM} \geq 0$ (criterion C2),
where:
$FT_{BM}$ is the quenching factor of the least hardenable steel substrate among the steel substrates of the two precoated sheets, and
the quenching factors $FT_{WJ}$ and $FT_{BM}$ are determined using the following formula: $FT = 128 + 1553 \times C + 55 \times Mn + 267 \times Si + 49 \times Ni + 5 \times Cr - 79 \times Al - 2 \times Ni^2 - 1532 \times C^2 - 5 \times Mn^2 - 127 \times Si^2 - 40 \times C \times Ni - 4 \times Ni \times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint in the case of $FT_{WJ}$ and the least hardenable substrate in the case of $FT_{BM}$, and
(b) a carbon content $C_{WJ}$ of the weld joint strictly smaller than 0.15 wt. % or, if the carbon content $C_{WJ}$ of the weld joint is greater than or equal to 0.15 wt. %, a softening factor $FA_{WJ}$ of the weld joint such that $FA_{WJ} > 5000$ (Criterion C3), where the softening factor $FA_{WJ}$ of the weld joint is calculated as a function of the mean aluminum, chromium, nickel, molybdenum, carbon, manganese and silicon content of the weld joint, expressed in weight percent, using the following formula:

$$FA=10291+4384.1\times Mo+3676.9\times Si-522.64\times Al-2221.2\times Cr-118.11\times Ni-1565.1\times C-246.67\times Mn,$$

and the weld joint is such that, after hot press-forming and cooling, the maximum hardness variation $\Delta HV(WJ)$ across the weld joint is smaller than or equal to 20% of the mean hardness $HV_{mean}(WJ)$ of the weld joint.

According to particular embodiments of the steel blank wherein the carbon content $C_{WJ}$, in weight percent, of the weld joint is such that $1.25\times C_{BM(most\ hardenable)}-C_{WJ}\geq 0$ (criterion C4), where $C_{BM}$ is the carbon content, in weight percent, of most hardenable steel substrate among the steel substrates of the two precoated sheets, and the nickel content $Ni_{WJ}$ of the weld joint is comprised between 2.0 wt. % and 11.0 wt. % (criterion C5).

A welded, hot press-formed and cooled steel part is also provided comprising a first coated steel part portion and a second coated steel part portion, each coated steel part portion comprising a steel substrate having, on at least one of its main faces, a coating comprising at least iron and aluminum, the first and second coated steel part portions being joined by a weld joint, the weld joint being characterized by:

(a) a quenching factor $FT_{WJ}$ of the weld joint such that $FT_{WJ}-0.9FT_{BM}\geq 0$ (criterion C2),
where:
   $FT_{BM}$ is the quenching factor of the least hardenable steel substrate among the steel substrates of the two precoated sheets, and
   the quenching factors $FT_{WJ}$ and $FT_{BM}$ are determined using the following formula: $FT=128+1553\times C+55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint in the case of $FT_{WJ}$ and the least hardenable substrate in the case of $FT_{BM}$, and (b) a carbon content $C_{WJ}$ of the weld joint strictly smaller than 0.15 wt. % or, if the carbon content $C_{WJ}$ of the weld joint is greater than or equal to 0.15 wt. %, a softening factor $FA_{WJ}$ of the weld joint such that $FA_{WJ}>5000$ (Criterion C3), where the softening factor $FA_{WJ}$ of the weld joint is calculated as a function of the mean aluminum, chromium, nickel, molybdenum, carbon, manganese and silicon content of the weld joint, expressed in weight percent, using the following formula:

$$FA=10291+4384.1\times Mo+3676.9\times Si-522.64\times Al-2221.2\times Cr-118.11\times Ni-1565.1\times C-246.67\times Mn,$$

and the maximum hardness variation $\Delta HV(WJ)$ across the weld joint is smaller than or equal to 20% of the mean hardness $HV_{mean}(WJ)$ of the weld joint.

According to particular embodiments of the welded, hot press-formed and cooled steel part may comprise one or several of the following features, taken alone or according to any possible combination:
   the hardness drop in the Heat Affected Zone relative to the base metal of the first and second coated steel part portions adjacent thereto is smaller than or equal to 8%,
   the mean hardness $HV_{mean}(WJ)$ in the weld joint is smaller than or equal to 600 HV,
   the carbon content $C_{WJ}$, in weight percent, in the weld joint is such that $1.25\times C_{BM}-C_{WJ}\geq 0$ (criterion C4), where $C_{BM}$ is the carbon content, in weight percent, of most hardenable steel substrate among the steel substrates of the first and second coated steel part portions,
   the nickel content $Ni_{WJ}$ in the weld joint is comprised between 2.0 wt. % and 11.0 wt. % (criterion C5),
   the steel of the substrate of at least one among the first and the second coated steel part portions comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ the rest being iron and impurities resulting from manufacturing,
   the steel of the substrate of at least one among the first and the second coated steel part portions comprises, by weight:

$0.15\% \leq C \leq 0.25\%$ $0.8\% \leq Mn \leq 1.8\%$ $0.1\% \leq Si \leq 0.35\%$ $0.01\% \leq Cr \leq 0.5\%$ $Ti \leq 0.1\%$ $Al \leq 0.1\%$ $S \leq 0.05\%$ $P \leq 0.1\%$ $B \leq 0.005\%$ the rest being iron and impurities resulting from manufacturing,
   the steel of the substrate of at least one among the first and the second coated steel part portions comprises, by weight:

$0.040\% \leq C \leq 0.100\%$ $0.80\% \leq Mn \leq 2.00\%$ $Si \leq 0.30\%$ $S \leq 0.005\%$ $P \leq 0.030\%$ $0.010\% \leq Al \leq 0.070\%$ $0.015\% \leq Nb \leq 0.100\%$ $Ti \leq 0.080\%$

N≤0.009%

Cu≤0.100%

Ni≤0.100%

Cr≤0.100%

Mo≤0.100%

Ca≤0.006%, the rest being iron and impurities resulting from manufacturing, the steel of the substrate of at least one among the first and the second coated steel part portions comprises, by weight:

0.24%≤C≤0.38%

0.40%≤Mn≤3%

0.10%≤Si≤0.70%

0.015%≤Al≤0.070%

0%≤Cr≤2%

0.25%≤Ni≤2%

0.015%≤Ti≤0.10%

0%≤Nb≤0.060%

0.0005%≤B≤0.0040%

0.003%≤N≤0.010%

0.0001%≤S≤0.005%

0.0001%≤P≤0.025% wherein the titanium and nitrogen contents satisfy the following relationship:

Ti/N>3.42.

and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:

0.05%≤Mo≤0.65%

0.001%≤W≤0.30%%

0.0005%≤Ca≤0.005% the rest being iron and impurities inevitably resulting from manufacturing.

A welded, hot press-formed and cooled steel part as described above is also provided for producing an anti-intrusion part or an energy-absorption part for a motor vehicle.

BRIEF DESCRIPTION OF THE DRAWINGS

The invention will be better understood upon reading the following specification, given only by way of example and with reference to the appended drawings, wherein.

DETAILED DESCRIPTION

In the entire patent application, the contents of the elements are expressed in percentages by weight (wt. %).

In the context of the present disclosure, the expression "Heat Affected Zone" is used for designating the Heat Affected Zone created by the welding operation in the welded steel blank, but also, by extension, for designating, within the welded, hot press-formed and cooled steel part, the zone obtained by hot press-forming and cooling of the Heat Affected Zone of the welded steel blank.

The Heat Affected Zone extends on each side of the weld joint, from the weld joint, for example over a width comprised between 150 and 500 micrometers.

The base metal is the portion of the substrates of the precoated sheets or coated steel part portions located adjacent to the Heat Affected Zone created by the welding operation.

The present disclosure provides a method for producing a welded steel blank 1.

The method comprises a first step of providing two precoated sheets 2.

Figure 1:
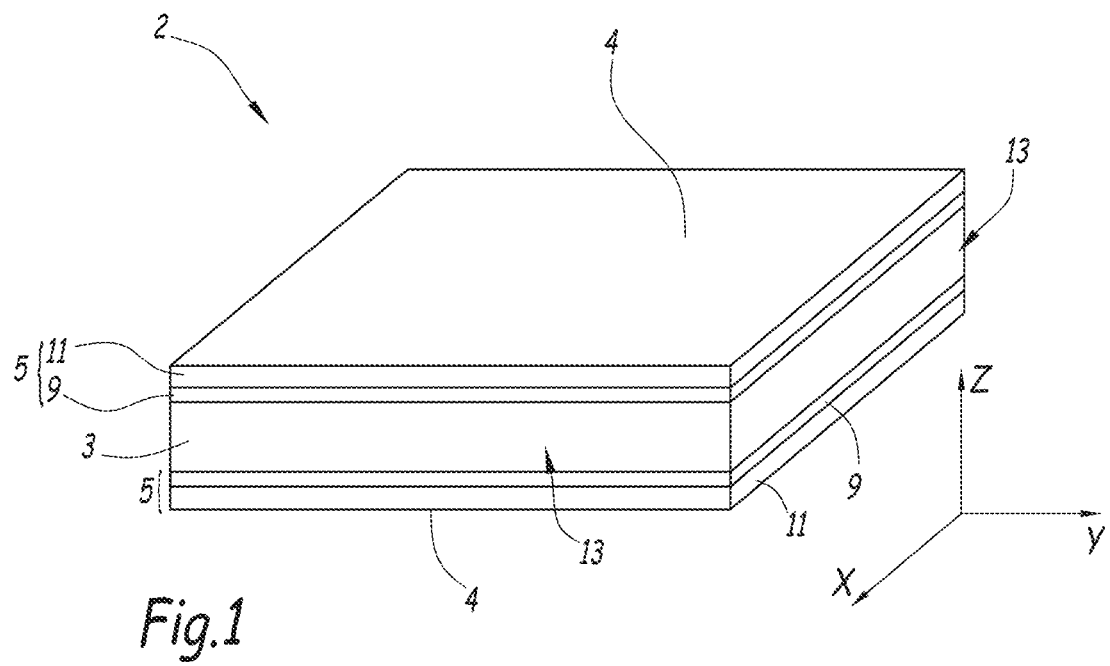
FIG. 1 is a perspective view of a precoated sheet.

As shown in FIG. 1, each precoated sheet 2 comprises two main faces 4 and at least one side face 13, extending between the two main faces 4, from one main face 4 to the other. In the example shown in FIG. 1, the precoated sheet 2 comprises four side faces 13. For example, the side faces 13 form an angle comprised between 60° and 90° with one of the main faces 4.

Each precoated sheet 2 comprises a metallic substrate 3 having, on at least one of its main faces, a precoating 5. The precoating 5 is superimposed on the substrate 3 and in contact therewith.

The metallic substrate 3 is more particularly a steel substrate.

The steel of the substrate 3 is more particularly a steel having a ferrito-perlitic microstructure.

Preferably, the substrate 3 is made of a steel intended for thermal treatment, more particularly a press-hardenable steel, and for example a manganese-boron steel, such as for example a 22MnB5 type steel.

According to one embodiment, the steel of the substrate 3 comprises, and for example consists of, by weight:

0.10%≤C≤0.5%

0.5%≤Mn≤3%

0.1%≤Si≤1%

0.01%≤Cr≤1%

Ti≤0.2%

Al≤0.1%

S≤0.05%

P≤0.1%

B≤0.010% the rest being iron and impurities resulting from manufacturing.

More particularly, the steel of the substrate 3 comprises, by weight:

0.15%≤C≤0.25%

0.8%≤Mn≤1.8%

0.1%≤Si≤0.35%

0.01%≤Cr≤0.5%

Ti≤0.1%

Al≤0.1%

S≤0.05%

P≤0.1%

B≤0.005% the rest being iron and impurities resulting from manufacturing.

According to an alternative, the steel of the substrate 3 comprises, and for example consists of, by weight:

0.040%≤C≤0.100%

0.80%≤Mn≤2.00%

Si≤0.30%

S≤0.005%

P≤0.030%

0.010%≤Al≤0.070%

0.015%≤Nb≤0.100%

Ti≤0.080%

N≤0.009%

Cu≤0.100%

Ni≤0.100%

Cr≤0.100%

Mo≤0.100%

Ca≤0.006%, the rest being iron and impurities resulting from manufacturing.

According to an alternative, the steel of the substrate 3 comprises, and for example consists of, by weight:

0.24%≤C≤0.38%

0.40%≤Mn≤3%

0.10%≤Si≤0.70%

0.015%≤Al≤0.070%

0%≤Cr≤2%

0.25%≤Ni≤2%

0.015%≤Ti≤0.10%

0%≤Nb≤0.060%

0.0005%≤B≤0.0040%

0.003%≤N≤0.010%

0.0001%≤S≤0.005%

0.0001%≤P≤0.025% wherein the titanium and nitrogen contents satisfy the following relationship

Ti/N>3.42, and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:

0.05%≤Mo≤0.65%

0.001%≤W≤0.30%%

0.0005%≤Ca≤0.005% the rest being iron and impurities inevitably resulting from manufacturing.

According to one example, the substrates 3 of the two precoated sheets 2 have the same composition.

According to another example, the substrates 3 of the two precoated sheets 2 have different compositions. In particular, the two substrates 3 have different compositions each chosen among the four compositions mentioned above. For example, the steel of the substrate 3 of one precoated sheet 2 has the first composition mentioned above, while the steel of the substrate 3 of the other precoated sheet 2 has a composition chosen among the second, third or fourth compositions mentioned above.

The substrate 3 may be obtained, depending on its desired thickness, by hot rolling and/or by cold-rolling followed by annealing, or by any other appropriate method.

The substrate 3 advantageously has a thickness comprised between 0.8 mm and 5 mm, and more particularly comprised between 1.0 mm and 2.5 mm.

The precoating 5 is obtained by hot-dip coating, i.e. by immersion of the substrate 3 into a bath of molten metal.

The precoating 5 comprises at least an intermetallic alloy layer 9 in contact with the substrate 3. The intermetallic alloy layer 9 comprises at least iron and aluminum. The intermetallic alloy layer 9 is in particular formed by reaction between the substrate 3 and the molten metal of the bath. More particularly, the intermetallic alloy layer 9 comprises intermetallic compounds of the $Fe_x$—$Al_y$ type, and more particularly $Fe_2Al_5$.

In the example shown in FIG. 1, the precoating 5 further comprises a metallic alloy layer 11 extending atop the intermetallic alloy layer 9. The metallic alloy layer 11 has a composition which is close to that of the molten metal in the bath. It is formed by the molten metal carried away by the sheet as it travels through the molten metal bath during hot-dip coating. The metallic alloy layer 11 is a layer of aluminum, or a layer of aluminum alloy or a layer of aluminum-based alloy.

In this context, an aluminum alloy refers to an alloy comprising more than 50% by weight of aluminum. An aluminum-based alloy is an alloy in which aluminum is the main element, by weight.

For example, the metallic alloy layer 11 is a layer of aluminum alloy further comprising silicon. More particularly, the metallic alloy layer 11 comprises, by weight:

$8\% \leq Si \leq 11\%$, $2\% \leq Fe \leq 4\%$, the rest being aluminum and possible impurities.

The metallic alloy layer 11 has, for example, a thickness comprised between 19 μm and 33 μm or between 10 μm and 20 μm.

In the example shown in FIG. 1, where the precoating 5 comprises a metallic alloy layer 11, the thickness of the intermetallic alloy layer 9 is generally of the order of a few micrometers. In particular, its mean thickness is typically comprised between 2 and 8 micrometers.

The particular structure of the precoating 5 comprising the intermetallic alloy layer 9 and the metallic alloy layer 11 obtained by hot-dip coating is in particular disclosed in patent EP 2 007 545.

According to another embodiment, the precoating 5 only comprises the intermetallic alloy layer 9 as described above. In this case, the thickness of the intermetallic alloy layer 9 is for example comprised between 10 μm and 40 μm. Such a precoating 5 consisting of an intermetallic alloy 9 may for example be obtained by subjecting a precoating 5 comprising an intermetallic alloy layer 9 and a metallic alloy layer 11 as disclosed above to a pre-alloying treatment. Such a pre-alloying treatment is carried out at a temperature and for a holding time chosen so as to alloy the precoating 5 with the substrate 3 over at least a fraction of the thickness of the precoating 5. More particularly, the pre-alloying treatment may comprise the following steps: heating the sheet to a pre-alloying temperature comprised between 700° C. and 900° C. and holding the pre-alloyed sheet at this temperature for a time comprised between 2 minutes and 200 hours. In this case, the intermetallic alloy layer 9 may be composed of different intermetallic sublayers, such as $Fe_2Al_5$, $FeAl_3$, $FeAl$, $Fe_6Al_{12}Si_5$ and $FeAl_3$ sublayers.

Advantageously, as illustrated in FIG. 1, the substrate 3 has a precoating 5 as described above on both of its main faces.

Figure 2:
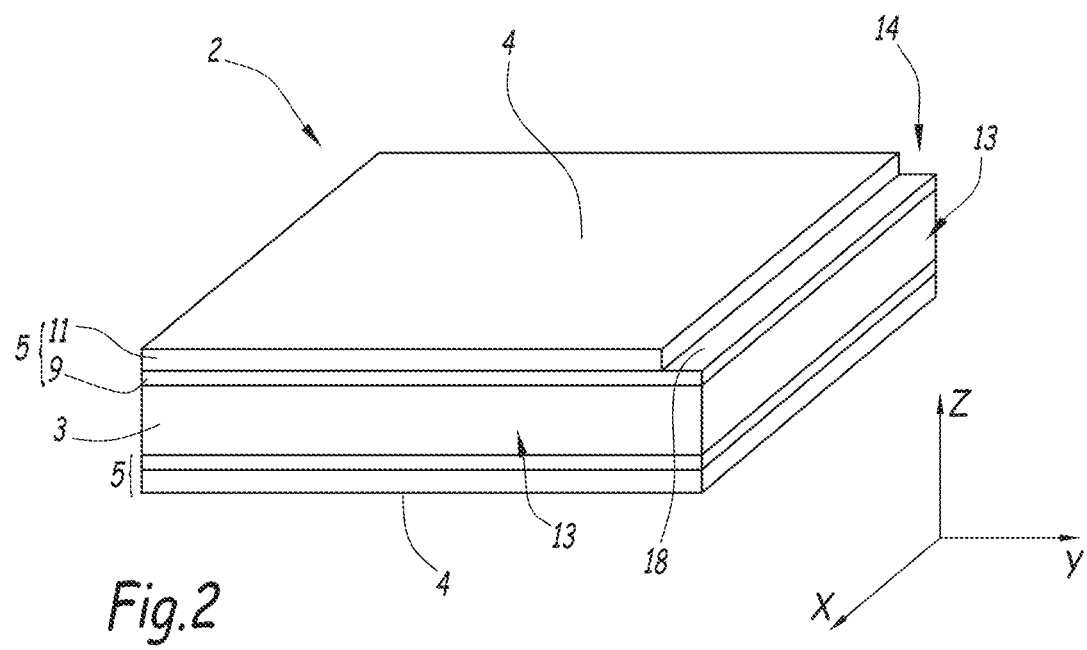
FIG. 2 is a perspective view of a precoated sheet comprising a removal zone in the precoating at the periphery of the sheet.

Optionally, as illustrated in FIG. 2, the method further comprises a step of preparing a weld edge 14 of at least one of the precoated sheets 2, and for example both precoated sheets 2.

The weld edge 14 comprises a peripheral portion of the precoated sheet 2 which is intended to be at least partially incorporated into the weld joint 22 during butt welding. More particularly, the weld edge 14 comprises a side face 13 and a portion of the precoated sheet 2 extending from this side face 13 and comprising a portion of the precoating 5 and a portion of the substrate 3.

More particularly, the preparation of the weld edge 14 may comprise at least one of the following processing steps:

removal of at least a portion of the precoating 5 at the weld edge 14 over a removal zone 18 as shown in FIG. 2, brushing of the weld edge 14, machining of the weld edge 14, chamfering of the weld edge 14, and/or beveling of the weld edge 14.

An example of a precoated sheet 2 comprising a removal zone 18 is shown in FIG. 2. The removal of at least one portion of the precoating 5 at the weld edge 14 is preferably carried out using a laser beam.

The removal zone 18 may extend over a width comprised between 0.5 mm and 2 mm from the side face 13 of the sheet 2.

Advantageously, in the removal zone 18, the metallic alloy layer 11 is removed, while the intermetallic alloy layer 9 remains over at least a fraction of its thickness. In this case, the remaining intermetallic alloy layer 9 protects the areas of the welded blank 1 immediately adjacent to the weld joint 22 from oxidation and decarburization during subsequent hot press-forming steps and from corrosion during the in-use life.

According to an embodiment, during the removal step, the intermetallic alloy layer 9 is left in its integrality or remains over only a fraction of its initial thickness, such as, for example, over only 60%, 80% or 90% of its initial thickness.

According to an embodiment, during the preparation step, the preparation of the weld edge 14 is carried out in such a manner that the precoating 5 remains entirely on at least one main face 4 of each of the two precoated sheets 2.

In particular, the weld edge 14 is prepared in such a manner that the weld joint 22 obtained by joining the two precoated sheets 2 through butt welding has an aluminum content greater than or equal to 0.7 wt. %, and more particularly greater than or equal to 1.0 wt. %, even more particularly greater than or equal to 1.5 wt. % and for example greater than or equal to 2.0 wt. %, or greater than or equal to 2.1 wt. %.

For example, for a precoating 5 comprising an aluminum-alloy layer as a metallic alloy layer 11 and having a thickness greater than or equal to 25 μm, and for usual weld widths (comprised between 0.8 mm and 1.8 mm), the aluminum content in the weld joint 22 will be higher than or equal to 0.7% by weight if, after preparation, the precoating 5 remains entirely on at least one face 4 of each of the two precoated sheets 2.

The brushing step allows at least partially removing the traces of precoating 5 on the weld edge 14, and more particularly on the side face 13, resulting from mechanical cutting operations and/or from a possible removal of the precoating 5 at the weld edge 14.

Chamfering or beveling the weld edge 14 allows increasing the amount of filler material added without resulting in an over-thickness at the weld joint 22.

Machining of the weld edge 14 is carried out in case the shape of the weld edge 14 prior to machining is not sufficiently straight for laser welding.

The method further comprises a step of butt welding the precoated sheets 2, after an optional preparation of the weld edge 14, using a filler wire 20 so as to obtain a welded steel blank 1.

Figure 3:
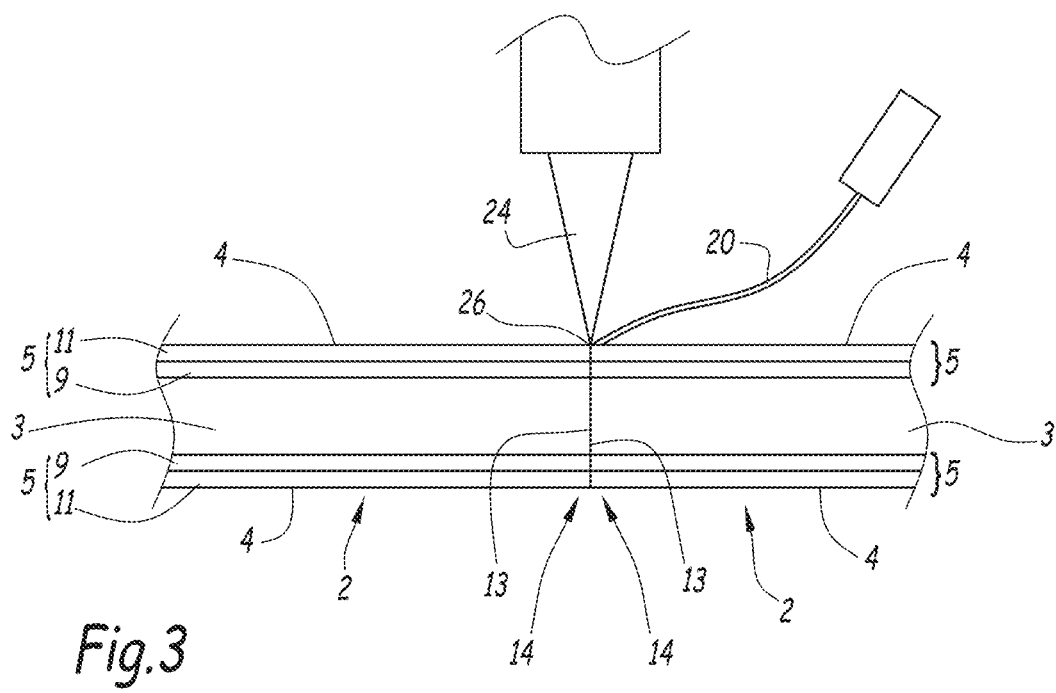
FIG. 3 is a schematic cross-sectional view of the beginning of the welding step of a method according to an embodiment of the invention.
Figure 4:
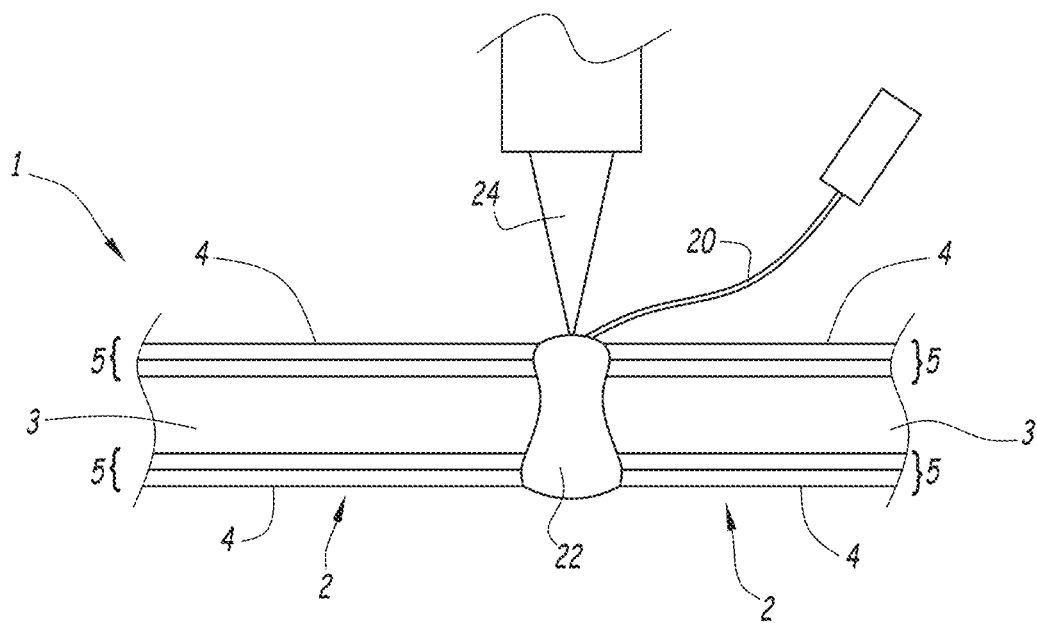
FIG. 4 is a schematic cross-sectional view of the end of the welding step of the method according to an embodiment of the invention.

FIGS. 3 and 4 illustrate two stages of the welding step to form the welded steel blank 1.

In the example shown in FIGS. 3 and 4, the precoated sheets 2 have not been subjected to any removal of their precoating 5 prior to welding. In this example, the precoating 5 remains integral on both main faces 4 of the precoated sheets 2 prior to welding. In this example, the two main faces of the precoated sheets 2 are entirely covered with the precoating 5 at the time of butt welding.

The welding operation results in the formation of a molten metal zone at the junction between the two sheets 2, which subsequently solidifies forming the weld joint 22.

The welding step is in particular a laser welding step, in which a laser beam 24 is directed towards the junction between the two sheets 2. This laser beam 24 is configured for melting the filler wire 20 at the point of impact 26 of the laser beam 24.

The laser welding step is for example carried out using a $CO_2$ laser or a solid state laser.

The laser source is preferably a high-powered laser source. It may be for example be selected from among a $CO_2$ laser with a wavelength of approximatively 10 micrometers, a solid state laser source with a wavelength of approximatively 1 micrometer or a semi-conductor laser source, for example a diode laser with a wavelength approximatively comprised between 0.8 and 1 micrometer.

The power of the laser source is chosen depending on the thickness of the sheets 2. In particular, the power is chosen so as to allow the fusion of the filler wire 20 and of the weld edges 14 of the sheets 2, as well as a sufficient mixing in the weld joint 22. For a $CO_2$ laser, the laser power is for example comprised between 3 kW and 12 kW. For a solid state laser or a semi-conductor laser, the laser power is for example comprised between 2 kW and 8 kW.

The diameter of the laser beam 24 at the point of its impact 26 on the sheets 2 may be equal to about 600 µm for both types of laser sources.

During the welding step, the welding is for example carried out under a protective atmosphere. Such a protective atmosphere in particular prevents the oxidation and decarburization of the area where the weld is being performed, the formation of boron nitride in the weld joint 22 and possible cold cracking due to hydrogen absorption.

The protective atmosphere is, for example, an inert gas or a mixture of inert gases. The inert gases may be helium or argon or a mixture of these gases.

During this welding step, the distance between the facing side faces 13 of the two sheets 1 is for example smaller than or equal to 0.3 mm, and more particularly smaller than or equal to 0.1 mm. Providing such a clearance between the facing side faces 13 of the two sheets 1 promotes the deposition of the filler metal during the welding operation and prevents the formation of an over-thickness at the weld joint 22. The deposition of the filler metal and the prevention of an over-thickness are also improved in the case where, during the preparation step, a chamfered or beveled edge has been produced at the weld edges 14 of the sheets 2.

During the welding step, the proportion of filler wire 20 added to the weld pool is for example comprised between 10% and 50%, and more particularly between 10% and 40%.

According to the present disclosure, the filler wire 20 has a carbon content comprised between 0.01 wt. % and 0.45 wt. % (criterion C1).

Furthermore, the composition of the filler wire 20 and the proportion of filler wire 20 added to the weld pool are chosen in such a manner that the thus obtained weld joint 22 is characterized by:

(a) a quenching factor $FT_{WJ}$ of the weld joint 22 such that $FT_{WJ} - 0.9 FT_{BM} \geq 0$ (criterion C2), where:

$FT_{BM}$ is the quenching factor of the least hardenable steel substrate 3 among the steel substrates 3 of the two precoated sheets 2, and the quenching factors $FT_{WJ}$ and $FT_{BM}$ are determined using the following formula: $FT = 128 + 1553 \times C + 55 \times Mn + 267 \times Si + 49 \times Ni + 5 \times Cr - 79 \times Al - 2 \times Ni^2 - 1532 \times C^2 - 5 \times Mn^2 - 127 \times Si^2 - 40 \times C \times Ni - 4 \times Ni \times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint 22 in the case of $FT_{WJ}$ and the least hardenable substrate 3 in the case of $FT_{BM}$, and (b) a carbon content $C_{WJ}$ of the weld joint 22 strictly smaller than 0.15 wt. % or, if the carbon content $C_{WJ}$ of the weld joint 22 is greater than or equal to 0.15 wt. %, a softening factor $FA_{WJ}$ of the weld joint 22 such that $FA_{WJ} > 5000$ (criterion C3), where the softening factor $FA_{WJ}$ of the weld joint 22 is calculated as a function of the mean aluminum, chromium, nickel, molybdenum, carbon, manganese and silicon content of the weld joint 22, expressed in weight percent, using the following formula:

$$FA = 10291 + 4384.1 \times Mo + 3676.9 \times Si - 522.64 \times Al - 2221.2 \times Cr - 118.11 \times Ni - 1565.1 \times C - 246.67 \times Mn.$$

The least hardenable substrate 3 among the substrates 3 of the precoated sheets 2 is the substrate 3 having the lowest carbon content.

Indeed, the inventors of the present disclosure have found, in a surprising manner, that when the above criteria C1, C2 and C3 are fulfilled, a part obtained from such a welded steel blank 1 after thermal treatment including an austenitization step (hot press-forming and cooling in the press tool) presents a metallurgical guarantee not to fail in the weld joint 22 or in the Heat Affected Area adjacent to the weld joint 22, when subjected to tensile testing perpendicular to the weld joint 22, even if the weld joint 22 comprises an aluminum content greater than or equal to 0.7 wt. %, and even greater than or equal to 2.1%.

Therefore, it is possible, through the method according to the present disclosure, to obtain a part having a satisfactory crash performance at relatively low cost, despite a possibly relatively high aluminum content in the weld joint 22.

In particular, the production cost is reduced compared to methods necessitating removal of the precoating 5 on both main faces 4 of the precoated sheets 2, since it is no longer necessary to remove the precoating 5 on both faces of the precoated sheets 2. Rather, for a sheet 2 coated on both main faces 4, satisfactory properties may be obtained with a removal of the precoating 5 on only one main face 4 of the precoated sheets 2 or even without removal of the precoating 5 on any of the main faces 4 of the precoated sheets 2.

More particularly, the inventors of the present disclosure have found, in a surprising manner, that the use of a filler wire 20 having a carbon content comprised between 0.01 wt. % and 0.45 wt. % (criterion C1) allows preventing the occurrence of carbon segregations and consequently hardness peaks in the weld joint 22 after hot press-forming and cooling in the press tool, especially in the presence of important amounts of aluminum in the weld joint 22. Therefore, using such a filler wire 20 reduces the brittleness of the weld joint 22 and participates in avoiding failure in the weld joint 22 of the part obtained after hot press-forming and cooling in the press tool under tension perpendicular to the weld joint 22. In particular, the inventors of the present disclosure have observed that, when a filler wire 20 having a carbon content comprised between 0.01 wt. % and 0.45 wt. % is used, the maximum hardness variation $\Delta HV(WJ)$ across the weld joint 22 is smaller than or equal to 20% of the mean hardness $HV_{mean}(WJ)$ of the weld joint 22. In other words, $$\frac{\Delta HV(WJ)}{HV_{mean}(WJ)} \times 100 \leq 20\%,$$

where $\Delta HV(WJ)$ is the difference between the maximum and the minimum hardness measured in the weld joint 22 and $HV_{mean}(WJ)$ is the mean hardness measured in the weld joint 22.

Furthermore, the inventors of the present disclosure have also found, in a surprising manner, that when the composition of the weld joint 22 fulfills criterion C2, the minimum hardness $HV_{min}(WJ)$ in the weld joint 22 after hot press-forming and cooling in the press tool is greater than or equal to the mean hardness $HV_{mean}(BM_{least\ hardenable})$ of the least hardenable among the two substrates 3 of the precoated sheets 2. Therefore, when criterion C2 is fulfilled, and assuming a homogenous mixing in the weld joint 22, failure under tension in a direction perpendicular to the weld joint 22 of the part obtained after hot press-forming and cooling in the press tool is not likely to occur in the weld joint 22.

Finally, the inventors have observed, surprisingly, that when the carbon content $C_{WJ}$ of the weld joint 22 is strictly smaller than 0.15 wt. % (criterion C3, first alternative), a hardness drop smaller than or equal to 8% occurs in the Heat Affected Zone of the part obtained after hot press-forming and cooling in the press tool relative to the base metal adjacent thereto.

When the carbon content $C_{WJ}$ of the weld joint 22 is greater than or equal to 0.15 wt. %, if the softening factor $FA_{WJ}$ is smaller than or equal to 5000, the inventors have observed a hardness drop greater than or equal to 10% in the Heat Affected Zone relative to the base metal adjacent thereto in the part obtained after hot press-forming and cooling in the press tool. On the contrary, when the softening factor $FA_{WJ}$ of the weld joint 22 is strictly greater than 5000 (criterion C3, second alternative), the inventors observed that, in the part obtained after hot press-forming and cooling in the press tool, the hardness drop in the Heat Affected Zone relative to the base metal adjacent thereto was smaller than or equal to 8%.

In this context, the hardness drop is defined as follows:

$$\frac{HV_{mean}(BM) - HV_{min}(HAZ)}{HV_{mean}(BM)} \times 100$$

In the context of the present disclosure, it is desirable to avoid hardness drops strictly greater than 8% in the Heat Affected Zone relative to the base metal adjacent thereto in the part obtained after hot press-forming and cooling in the press tool, since such a hardness drop increases the risk of failure in the Heat Affected Zone under tensile perpendicular to the weld joint.

Therefore, when the criterion C3 is fulfilled, the risk of a failure in the Heat Affected Zone is significantly reduced.

As a consequence, with the method according to the present disclosure, in which criteria C1, C2 and C3 are cumulatively fulfilled, failure under tension perpendicular to the weld joint 22 is not likely to occur in the Heat Affected Zone or in the weld joint 22.

Advantageously, the content of aluminum in the weld joint 22 is greater than or equal to 0.7 wt. %, more particularly greater than or equal to 1.0 wt. %, more particularly greater than or equal to 1.5 wt. % and even more particularly greater than or equal to 2.0 wt. %, and for example greater than or equal to 2.1 wt. %.

Advantageously, the composition of the filler wire 20 and the proportion of filler wire 20 added to the weld pool are further chosen in such a manner that the carbon content $C_{WJ}$ in the weld joint 22 is strictly smaller than or equal to 1.25 times the carbon content $C_{BM}$ of the most hardenable substrate 3 among the substrates 3 of the precoated sheets 2 forming the welded blank 1 (criterion C4). In other words, $1.25 \times C_{BM(most\ hardenable)} - C_{WJ} \geq 0$.

The most hardenable among the substrates 3 of the precoated sheets 2 forming the welded blank 1 is the substrate 3 having the highest carbon content.

Indeed, the inventors of the present disclosure have found out that, when this criterion C4 is observed, the risk of failure in the weld joint 22 after thermal treatment is even further reduced.

Preferably, the composition of the filler wire 20 and the proportion of filler wire 20 added to the weld pool are further chosen in such a manner that the nickel content $Ni_{WJ}$ of the weld joint 22 is comprised between 2.0 wt. % and 11.0 wt. % (criterion C5).

Indeed, the inventors have observed that the hardness in the weld joint 22 after thermal treatment is particularly stable when the criterion C5 is fulfilled. More particularly, in this case, a hardness difference $\Delta HV(WJ)$ smaller than or equal to 80 HV is observed across the weld joint 22 after hot press-forming and cooling in the press tool, even for carbon contents in the weld joint 22 greater than or equal to 0.15 wt. %. Such an improved stability is advantageous, since it even further reduces the risk of failure in the weld joint 22 due to the more even repartition of strain under tensile efforts.

For example, the filler wire 20 has the following composition, by weight:

0.001% ≤ C ≤ 0.45%, and more particularly
    0.02% ≤ C ≤ 0.45%, 0.001% ≤ Mn ≤ 30%, and more particularly
    0.05% ≤ Mn ≤ 20%.

0.001% ≤ Si ≤ 1%

0.001% ≤ Ni ≤ 56%

0.001% ≤ Cr ≤ 30%

0.001% ≤ Mo ≤ 5%

0.001% ≤ Al ≤ 0.30%

0.001% ≤ Cu ≤ 1.80%

0.001%≤Nb≤1.50%

0.001%≤Ti≤0.30%

0.001%≤N≤10%

0.001%≤V≤0.1%

0.001%≤Co≤0.20%, the rest being iron and impurities resulting from manufacturing.

For example, the filler wire 20 consists of the above-mentioned elements.

According to an example, the filler wire 20 has a composition as defined above, and a nickel content comprised between 0.001% and 7% by weight.

According to an alternative example, the filler wire 20 has a composition as defined above, and a nickel content comprised between 7% and 56% by weight.

According to a particular example, the filler wire 20 has the following composition, by weight:

0.02%≤C≤0.45%, 0.05%≤Mn≤20%

0.001%≤Si≤1%

7%≤Ni≤56%

0.001%≤Cr≤30%

0.001%≤Mo≤5%

0.001%≤Al≤0.30%

0.001%≤Cu≤1.80%

0.001%≤Nb≤1.50%

0.001%≤Ti≤0.30%

0.001%≤N≤10%

0.001%≤V≤0.1%

0.001%≤Co≤0.20%, the rest being iron and impurities resulting from manufacturing.

For example, the filler wire 20 consists of the above-mentioned elements.

The filler wire 20 is for example a solid wire or a fluxed core wire.

The present disclosure also relates to a welded steel blank 1 which may be obtained using the above-mentioned method.

Such a welded steel blank 1 comprises two precoated sheets 2, each precoated sheet 2 comprising a steel substrate 3 having a precoating 5 on at least one of its main faces 4, the precoating 5 comprising an intermetallic alloy layer 9 comprising at least iron and aluminum and, optionally, a metallic alloy layer 11 extending atop the intermetallic alloy layer 9, the metallic alloy layer 11 being a layer of aluminum, a layer of aluminum alloy or a layer of aluminum-based alloy, the precoated sheets 2 being joined by a weld joint 22.

The precoated sheets 2 and the weld joint 22 have the features disclosed above in relation to the method for producing the welded steel blank 1.

In particular, the weld joint 22 is such that, after hot press-forming and cooling in the press tool, the maximum hardness variation ΔHV(WJ) across the weld joint 22 is smaller than or equal to 20% of the mean hardness $HV_{mean}$(WJ) of the weld joint 22. In other words, $$\frac{\Delta HV(WJ)}{HV_{mean}(WJ)} \times 100 \le 20\%.$$

The weld joint 22 is further such that the minimum hardness $HV_{min}$(WJ) in the weld joint 22 after hot press-forming and cooling in the press tool is greater than or equal to the mean hardness $HV_{mean}(BM_{least\ hardenable})$ of the least hardenable among the two substrates 3 of the precoated sheets 2 after hot press-forming and cooling in the press tool.

The weld joint 22 is further such that, after hot press-forming and cooling in the press tool, the hardness drop in the Heat Affected Zone relative to the base metal adjacent thereto is smaller than or equal to 8%. In other words, $$\frac{HV_{mean}(BM) - HV_{min}(HAZ)}{HV_{mean}(BM)} \times 100 \le 8\%.$$

Advantageously, the weld joint 22 is such that, after hot press-forming and cooling in the press tool, the hardness difference ΔHV(WJ) across the weld joint 22 is smaller than or equal to 80 HV.

Advantageously, the weld joint 22 is such that the mean hardness $HV_{mean}$(WJ) in the weld joint 22 after hot press-forming and cooling in the press tool is smaller than or equal to 600 HV.

The present disclosure also relates to a method for producing a welded, hot press-formed and cooled steel part comprising:

producing a welded steel blank 1 using the method as described above;

heating the welded steel blank 1 so as to obtain a fully austenitic structure in the substrates 3 of the precoated sheets 2 constituting the welded blank 1;

hot press-forming the welded steel blank 1 in a press tool to obtain a steel part; and cooling the steel part in the press tool.

More particularly, during the heating step, the welded steel blank 1 is heated to an austenitization temperature. It is then held at the austenitization temperature for a holding time depending on the thickness of the sheets 2 forming the welded steel blank 1. The holding time is chosen depending on the austenitization temperature in such a manner that the welded blank 1 is austenitized and such that an alloyed intermetallic layer of predetermined thickness is formed by alloying between the substrates 3 and the precoating 5. For example, the holding time is equal to about 5 minutes.

Prior to hot press-forming, the thus heated welded steel blank 1 is transferred into the hot forming press tool. The transfer time is advantageously comprised between 5 and 10 seconds. The transfer time is chosen to be as short as possible in order to avoid metallurgical transformations in the welded steel blank 1 prior to hot press-forming.

During the cooling step, the cooling rate is greater than or equal to the critical martensitic or bainitic cooling rate of at least one of the substrates 3 of the two steel sheets 2, and for example of the most hardenable steel sheet 1, i.e. the steel sheet having the lowest critical cooling rate.

The present disclosure also relates to the welded, hot press-formed and cooled steel part obtained using the above-described method.

More particularly, this steel part comprises a first coated steel part portion and a second coated steel part portion, respectively resulting from the hot press-forming and cooling in the press tool of the two precoated steel sheets 2.

More particularly, each coated steel part portion comprises a steel substrate having, on at least one of its main faces, a coating comprising iron and aluminum, the first and second steel part portions being joined by a weld joint 22 as described above.

In particular, the coating of the first and second steel part portions results from the at least partial alloying of the precoating 5 during the hot-press forming.

The substrates of the first and second steel part portions have the compositions described above for the precoated sheets 2. They result from the hot-press forming and cooling of the substrates 3 of the precoated sheets 2.

The weld joint 22 is such that the maximum hardness variation ΔHV(WJ) across the weld joint 22 is smaller than or equal to 20% of the mean hardness $HV_{mean}$(WJ) of the weld joint 22. In other words, $$\frac{\Delta HV(WJ)}{HV_{mean}(WJ)} \times 100 \leq 20\%.$$

The minimum hardness $HV_{min}$(WJ) in the weld joint 22 is greater than or equal to the mean hardness ($HV_{mean}$ ($BM_{least\ hardenable}$) of the least hardenable among the two substrates 3 of the precoated sheets 2 after hot press-forming and cooling in the press tool.

Furthermore, for each of the first and second coated steel part portions, the hardness drop in the Heat Affected Zone relative to the base metal adjacent thereto is smaller than or equal to 8%. In other words, $$\frac{HV_{mean}(BM) - HV_{min}(HAZ)}{HV_{mean}(BM)} \times 100 \leq 8\%.$$

Advantageously, the hardness difference ΔHV(WJ) across the weld joint 22 is smaller than or equal to 80 HV.

Advantageously, the mean hardness $HV_{mean}$(WJ) in the weld joint 22 is smaller than or equal to 600 HV.

The inventors of the present disclosure have carried out experiments in which welded steel blanks 1 were produced by butt laser welding together two precoated sheets A and B using a filler wire W.

Table 1 below lists the experimental conditions for each of the experiments E1 to E21 carried out.

The precoated sheets A and B initially provided had a precoating 5 on both of their main faces 4 with a thickness of about 25 micrometers.

For all of the tested precoated sheets A and B, the precoating 5 was obtained by hot-dip coating in a bath of molten metal and comprised a metallic alloy layer 11 and an intermetallic alloy layer 9.

The metallic alloy layer 11 of the precoating 5 comprised, by weight:

Si: 9%

Fe: 3%, the rest consisting of aluminum and possible impurities resulting from elaboration.

The metallic alloy layer 11 had an average total thickness of 20 μm.

The intermetallic alloy layer 9 contained intermetallic compounds of the $Fe_x$—$Al_y$ type, and majoritarily $Fe_2Al_3$. $Fe_2Al_5$ and $Fe_xAl_ySi_z$. It has an average thickness of 5 μm.

As can be seen in the column entitled "Removal of the precoating at the weld edge" in Table 1, some of the welded blanks 1 were obtained after removal of the metallic alloy alloy 11 of the precoating 5 on one of the main faces 4 of each of the precoated sheets A and B prior to butt welding ("Removal one face") and some were obtained by welding of the precoated sheets 2 with their precoating 5 intact on both of their main faces 4 ("No"). The removal was carried out through laser ablation using the method disclosed in prior application WO 2007/118939.

TABLE 1

List of experimental conditions

| Exp. | Composition substrate sheet A (least quenchable substrate) | Thickness Sheet A (mm) | Composition substrate sheet B (most quenchable substrate) | Thickness Sheet B (mm) | Removal of precoating at weld edge? | Filler wire W | Proportion of filler wire added to weld pool (%) |
|---|---|---|---|---|---|---|---|
| E1 | S1 | 1.5 | S1 | 1.5 | No removal | W1 | 20% |
| E2 | S1 | 1.5 | S1 | 1.5 | No removal | W2 | 22% |
| E3 | S2 | 1.2 | S2 | 1.2 | No removal | W3 | 21% |
| E4 | S2 | 1.2 | S2 | 1.2 | No removal | W3 | 27% |
| E5 | S2 | 1.2 | S2 | 1.2 | No removal | W4 | 11% |
| E6 | S2 | 1.2 | S2 | 1.2 | No removal | W4 | 15% |
| E7 | S2 | 1.2 | S2 | 1.2 | No removal | W5 | 13% |
| E8 | S2 | 1.2 | S2 | 1.2 | No removal | W5 | 19% |

TABLE 1-continued

List of experimental conditions

| Exp. | Composition substrate sheet A (least quenchable substrate) | Thickness Sheet A (mm) | Composition substrate sheet B (most quenchable substrate) | Thickness Sheet B (mm) | Removal of precoating at weld edge? | Filler wire W | Proportion of filler wire added to weld pool (%) |
|---|---|---|---|---|---|---|---|
| E9 | S3 | 1.6 | S3 | 1.6 | No removal | W6 | 18% |
| E10 | S4 | 1.5 | S4 | 1.5 | No removal | W6 | 16% |
| E11 | S2 | 1.2 | S2 | 1.2 | No removal | W5 | 27% |
| E12 | S5 | 1.6 | S5 | 1.6 | No removal | W7 | 33% |
| E13 | S6 | 1.5 | S6 | 1.5 | Removal on one face | W8 | 18% |
| E14 | S7 | 2.0 | S8 | 1.5 | Removal on one face | W9 | 26% |
| E15 | S9 | 1.0 | S10 | 1.2 | No removal | W9 | 25% |
| E16 | S6 | 1.5 | S6 | 1.5 | No removal | W9 | 22% |
| E17 | S6 | 1.5 | S7 | 2.0 | No removal | W9 | 22% |
| E18 | S9 | 1.0 | S10 | 1.2 | No removal | W9 | 25% |
| E19 | S9 | 1.0 | S10 | 1.2 | No removal | W9 | 22% |
| E20 | S11 | 1.2 | S12 | 1.0 | No removal | W1 | 17% |
| E21 | S11 | 1.2 | S12 | 1.0 | No removal | W2 | 22% |

In the above table, the experiments which are not according to the invention are underlined.

The steel substrates used in the different experiments mentioned in Table 1 have the compositions listed in Table 2 below, the contents being expressed in weight %.

TABLE 2

Compositions of the substrates

| | % C | % Mn | % Al | % Cr | % Si | % Ti | % B | % Nb | % P | % S |
|---|---|---|---|---|---|---|---|---|---|---|
| S1 | 0.06 | 1.57 | 0.02 | 0.02 | 0.02 | 0.07 | — | 0.048 | <0.020 | <0.005 |
| S2 | 0.22 | 1.17 | 0.04 | 0.17 | 0.25 | 0.040 | 0.003 | — | <0.025 | <0.005 |
| S3 | 0.06 | 1.6 | 0.02 | 0.02 | 0.02 | 0.07 | — | 0.048 | <0.020 | <0.005 |
| S4 | 0.23 | 1.19 | 0.04 | 0.18 | 0.26 | 0.040 | 0.003 | — | <0.025 | <0.005 |
| S5 | 0.24 | 1.2 | 0.03 | 0.2 | 0.27 | 0.040 | 0.003 | — | <0.025 | <0.005 |
| S6 | 0.22 | 1.16 | 0.04 | 0.2 | 0.25 | 0.040 | 0.003 | — | <0.025 | <0.005 |
| S7 | 0.22 | 1.15 | 0.04 | 0.18 | 0.26 | 0.040 | 0.003 | — | <0.025 | <0.005 |
| S8 | 0.22 | 1.15 | 0.04 | 0.19 | 0.27 | 0.040 | 0.003 | — | <0.025 | <0.005 |
| S9 | 0.22 | 1.18 | 0.03 | 0.17 | 0.25 | 0.040 | 0.003 | — | <0.025 | <0.005 |
| S10 | 0.22 | 1.18 | 0.03 | 0.17 | 0.26 | 0.040 | 0.003 | — | <0.025 | <0.005 |
| S11 | 0.22 | 1.2 | 0.05 | 0.19 | 0.26 | 0.040 | 0.003 | — | <0.025 | <0.005 |
| S12 | 0.24 | 1.24 | 0.04 | 0.17 | 0.27 | 0.040 | 0.003 | — | <0.025 | <0.005 |

For all the substrates, the rest of the composition is iron, possible impurities and unavoidable elements resulting from the manufacturing.

In the above Table 2, "-" means that the substrate comprises at most traces of the considered element.

The filler wires W used in the different experiments mentioned in Table 1 have the compositions listed in Table 3 below, the contents being expressed in weight %.

TABLE 3

Composition of the filler wires W

| Filler wire W | % C | % Mn | % Si | % Ni | % Cr | % Mo | % P | % S | Other elements (in %) |
|---|---|---|---|---|---|---|---|---|---|
| W1 | 0.02 | 1.90 | 0.70 | 13.60 | 23.00 | 0.16 | <0.05 | <0.05 | Cu: 0.06; N: 0.08 |
| W2 | 0.03 | 1.80 | 0.50 | 25.00 | 20.50 | 4.70 | <0.05 | <0.05 | Cu: 1.60 |
| W3 | 0.24 | 0.55 | 0.27 | 35.38 | 0.04 | 0.001 | <0.05 | <0.05 | Al: 0.12; Cu: 0.10; Nb: 1.29; Ti: 0.27; B: 0.001 |
| W4 | 0.02 | 0.30 | 0.29 | 53.24 | 0.05 | 0.02 | <0.05 | <0.05 | Al: 0.06; Cu: 0.02; Co: 0.07; V: 0.01; Nb: 0.008 |
| W5 | 0.25 | 11.24 | 0.10 | 41.83 | 0.001 | 0.001 | <0.05 | <0.05 | Al: 0.27; Cu: 0.03 |
| W6 | 0.10 | 1.77 | 0.68 | 1.84 | 0.36 | 0.45 | <0.05 | <0.05 | Al: 0.01; Cu: 0.04; V < 0.01; Ti < 0.01 |
| W7 | 0.30 | 0.52 | 0.23 | 0.03 | 0.94 | 0.18 | <0.05 | <0.05 | Al: 0.02; Cu: 0.13 |
| W8 | 1.10 | 2.00 | 0.40 | 0.001 | 1.80 | 0.001 | <0.05 | <0.05 | Ti: 0.20 |
| W9 | 0.64 | 13.17 | 0.001 | 2.57 | 0.01 | 0.001 | <0.05 | <0.05 | Cu: 0.08 |

For all the welding wires, the rest of the composition is iron, possible impurities and unavoidable elements resulting from the manufacturing.

The inventors then measured, for each experiment E1 to E21, the composition of the obtained weld joint 22, using conventional measurement methods.

The manganese, aluminum, nickel, chromium, molybdenum and silicon contents of the weld joint 22 were determined on a cross-section of the samples taken perpendicularly to the weld joint 22 using an Energy Dispersive Spectroscopy detector integrated on a Scanning Electron Microscope. The carbon content was determined using a Casting electron microprobe on a cross-section of the samples taken perpendicularly to the weld joint 22. The results of these measurements are indicated in Table 4 below.

TABLE 4

Measured contents in the weld joints

| Experiment | % C | % Mn | % Al | % Ni | % Cr | % Mo | % Si |
|---|---|---|---|---|---|---|---|
| E1 | 0.05 | 1.32 | 1.13 | 2.70 | 4.49 | 0.03 | 0.26 |
| E2 | 0.05 | 1.60 | 1.18 | 5.53 | 4.17 | 1.03 | 0.19 |
| E3 | 0.22 | 1.25 | 2.05 | 7.48 | 0.23 | 0.00 | 0.66 |
| E4 | 0.23 | 1.10 | 1.89 | 9.62 | 0.20 | 0.00 | 0.61 |
| E5 | 0.20 | 1.20 | 2.14 | 5.96 | 0.21 | 0.00 | 0.61 |
| E6 | 0.19 | 1.21 | 1.93 | 8.23 | 0.23 | 0.00 | 0.67 |
| E7 | 0.22 | 2.45 | 1.86 | 5.60 | 0.25 | 0.00 | 0.59 |
| E8 | 0.23 | 2.89 | 1.80 | 8.05 | 0.24 | 0.00 | 0.60 |
| E9 | 0.07 | 1.52 | 1.68 | 0.33 | 0.04 | 0.15 | 0.15 |
| E10 | 0.21 | 1.20 | 1.68 | 0.29 | 0.19 | 0.07 | 0.37 |
| E11 | 0.23 | 3.91 | 2.00 | 11.40 | 0.12 | 0.00 | 0.22 |
| E12 | 0.26 | 1.00 | 1.17 | 0.00 | 0.31 | 0.02 | 0.34 |
| E13 | 0.38 | 1.17 | 1.04 | 0.01 | 0.33 | 0.02 | 0.53 |
| E14 | 0.33 | 3.47 | 1.12 | 0.45 | 0.28 | 0.02 | 0.63 |
| E15 | 0.32 | 3.28 | 1.25 | 0.42 | 0.15 | 0.02 | 0.35 |
| E16 | 0.31 | 2.84 | 1.07 | 0.33 | 0.06 | 0.02 | 0.35 |
| E17 | 0.31 | 2.95 | 1.11 | 0.35 | 0.16 | 0.02 | 0.34 |
| E18 | 0.32 | 3.28 | 1.25 | 0.42 | 0.15 | 0.02 | 0.35 |
| E19 | 0.31 | 2.87 | 1.46 | 0.33 | 0.15 | 0.02 | 0.37 |
| E20 | 0.19 | 1.33 | 1.49 | 2.29 | 3.95 | 0.03 | 0.44 |
| E21 | 0.18 | 1.32 | 1.28 | 5.41 | 4.42 | 1.06 | 0.34 |

Based on these measurements, the inventors determined, for each of the welded steel blanks 1 according to the experiments E1 to E21, whether or not the criteria C1, C2, C3 according to the invention and the optional additional criteria C4 and C5 were complied with. The results of this determination are summarized in Table 5 below.

TABLE 5

Values of the criteria in the weld joints

| Exp. | C1 | C2 | C3 | C4 | C5 |
|---|---|---|---|---|---|
| | $0.01 \leq \% C_{FW} \leq 0.45$ | $FT_{WJ} - 0.9*FT_{BM}$ (least hardenable) | % $C_{WJ}$ | $FA_{WJ}$ (if % $C_{WJ} \geq C_{BM(most\ hardenable)}$ - 0.15) | $1.25*\% C_{BM(most\ hardenable)} - \% C_{WJ}$ | % $Ni_{WJ}$ |
| E1 | yes | 95.74 | 0.05 | n.a. | 0.02 | 2.70 |
| E2 | yes | 153.22 | 0.05 | n.a. | 0.02 | 5.53 |
| E3 | yes | 111.16 | 0.22 | 9593 | 0.05 | 7.48 |
| E4 | yes | 120.01 | 0.23 | 9341 | 0.05 | 9.62 |
| E5 | yes | 67.54 | 0.20 | 9640 | 0.08 | 5.96 |
| E6 | yes | 103.18 | 0.19 | 9669 | 0.09 | 8.23 |
| E7 | yes | 118.80 | 0.22 | 9317 | 0.05 | 5.60 |
| E8 | yes | 131.09 | 0.23 | 9006 | 0.05 | 8.05 |
| E9 | yes | −50.74 | 0.07 | n.a. | 0.01 | 0.33 |
| E10 | yes | −64.84 | 0.21 | 10000 | 0.08 | 0.29 |
| E11 | yes | −6.47 | 0.23 | 7120 | 0.05 | 11.40 |
| E12 | yes | −16.50 | 0.26 | 9676 | 0.04 | 0.00 |
| E13 | no | 121.60 | 0.38 | 10164 | −0.11 | 0.01 |
| E14 | no | 184.54 | 0.33 | 10061 | −0.06 | 0.45 |
| E15 | no | 126.14 | 0.32 | 9312 | −0.05 | 0.42 |
| E16 | no | 121.23 | 0.31 | 9748 | −0.04 | 0.33 |
| E17 | no | 122.01 | 0.31 | 9433 | −0.04 | 0.35 |

TABLE 5-continued

Values of the criteria in the weld joints

| | | | Criteria | | |
|---|---|---|---|---|---|
| Exp. | C1 | C2 | C3 | C4 | C5 |
| E18 | no | 126.14 | 0.32 | 9312 | −0.05 | 0.42 |
| E19 | no | 94.35 | 0.31 | 9408 | −0.04 | 0.33 |
| E20 | yes | 33.72 | 0.19 | 1599 | 0.11 | 2.29 |
| E21 | yes | 95.46 | 0.18 | 4457 | 0.12 | 5.41 |

Underlined values: not corresponding to the invention

As can be seen from Table 5, the experiments referenced E1 to E8 are examples according to the invention: in these experiments, criteria C1 to C3 are satisfied.

On the contrary, the experiments referenced E9 to E21 are not according to the invention: in these experiments, at least one criterion among criteria C1 to C3 is not satisfied.

Finally, the inventors subjected the thus produced welded steel blanks 1 to a heat treatment comprising an austenitization, followed by rapid cooling so as to obtain heat treated parts. Such heat treated parts have the same properties as hot press-formed and cooled parts. The inventors then carried out measurements to determine the mechanical properties of these parts. The results of these measurements are shown in Table 6 below.

TABLE 6

Results of hardness measurements after heat treatment

| | | Hardness after Heat Treatment | | | | | |
|---|---|---|---|---|---|---|---|
| Exp. | Tensile test Failure location from 5 tests) | $[\Delta HV(WJ)/HV_{mean}(WJ)] \times 100$ (in %) | $HV_{min}(WJ) - HV_{mean}$ (BM least hardenable) (in HV) | $[[HV_{mean}(BM) - HV_{min}(HAZ)]/HV_{mean}(BM)] \times 100$ (in %) | $\Delta HV(WJ)$ (in HV) | $HV_{mean}(WJ)$ (in HV) | $HV_{max}(WJ)$ (in HV) |
| E1 | 100% outside of weld joint and HAZ | 15 | 133 | 3 | 58 | 393 | 429 |
| E2 | 100% outside of weld joint and HAZ | 18 | 132 | 2 | 73 | 407 | 448 |
| E3 | 100% outside of weld joint and HAZ | 5 | 37 | 1 | 29 | 539 | 553 |
| E4 | 100% outside of weld joint and HAZ | 4 | 27 | 2 | 19 | 534 | 543 |
| E5 | 100% outside of weld joint and HAZ | 9 | 13 | 2 | 47 | 535 | 562 |
| E6 | 100% outside of weld joint and HAZ | 13 | 1 | 3 | 69 | 541 | 569 |
| E7 | 100% outside of weld joint and HAZ | 4 | 76 | 5 | 22 | 577 | 588 |
| E8 | 100% outside of weld joint and HAZ | 13 | 16 | 2 | 76 | 565 | 591 |
| E9 | 100% weld joint | 17 | −3 | −2 | 45 | 260 | 276 |
| E10 | 100% weld joint | 38 | −190 | −2 | 156 | 413 | 482 |
| E11 | 100% weld joint | 92 | −280 | 3 | 341 | 369 | 550 |
| E12 | 100% weld joint | 28 | −125 | 2 | 137 | 485 | 540 |
| E13 | 60% weld joint | 24 | 3 | 3 | 140 | 584 | 637 |

TABLE 6-continued

Results of hardness measurements after heat treatment

| Exp. | Tensile test Failure location from 5 tests) | [ΔHV(WJ)/ HV$_{mean}$ (WJ)]×100 (in %) | HV$_{min}$(WJ) − HV$_{mean}$ (BM least hardenable) (in HV) | [[HV$_{mean}$(BM) − HV$_{min}$(HAZ)]/ HV$_{mean}$(BM)]×100 (in %) | ΔHV(WJ) (in HV) | HV$_{mean}$ (WJ) (in HV) | HV$_{max}$ (WJ) (in HV) |
|---|---|---|---|---|---|---|---|
| E14 | 100% weld joint | 22 | 43 | 3 | 136 | 621 | 677 |
| E15 | 100% weld joint | 21 | 16 | 5 | 129 | 622 | 669 |
| E16 | 100% weld joint or HAZ | 41 | −98 | 4 | 235 | 567 | 664 |
| E17 | 100% weld joint or HAZ | 54 | −143 | 2 | 295 | 543 | 664 |
| E18 | 100% weld joint or HAZ | 21 | 16 | 5 | 128 | 622 | 668 |
| E19 | 100% weld joint or HAZ | 33 | −55 | 3 | 202 | 603 | 676 |
| E20 | 20% HAZ of the thinner BM, 80% BM | 14 | 4 | 10 | 77 | 543 | 585 |
| E21 | 20% HAZ of the thinner BM, 80% BM | 14 | 34 | 11 | 79 | 547 | 612 |

Underlined values: not corresponding to the invention

Tensile testing was carried out at ambient temperature (about 20° C.) using the method disclosed in the following standards: NF EN ISO 4136 and NF ISO 6892-1 on a transverse welded tensile specimen of the type EN 12.5×50 (240×30 mm), extracted perpendicular to the laser weld direction. For each experiment (E1 to E21), five tensile tests were carried out. The percentages indicated in the column entitled «Failure location» correspond, for each experiment (E1 to E21), to the percentage of tensile tests in which the failure occurred in the mentioned area (base metal, HAZ or weld joint).

Figure 5:
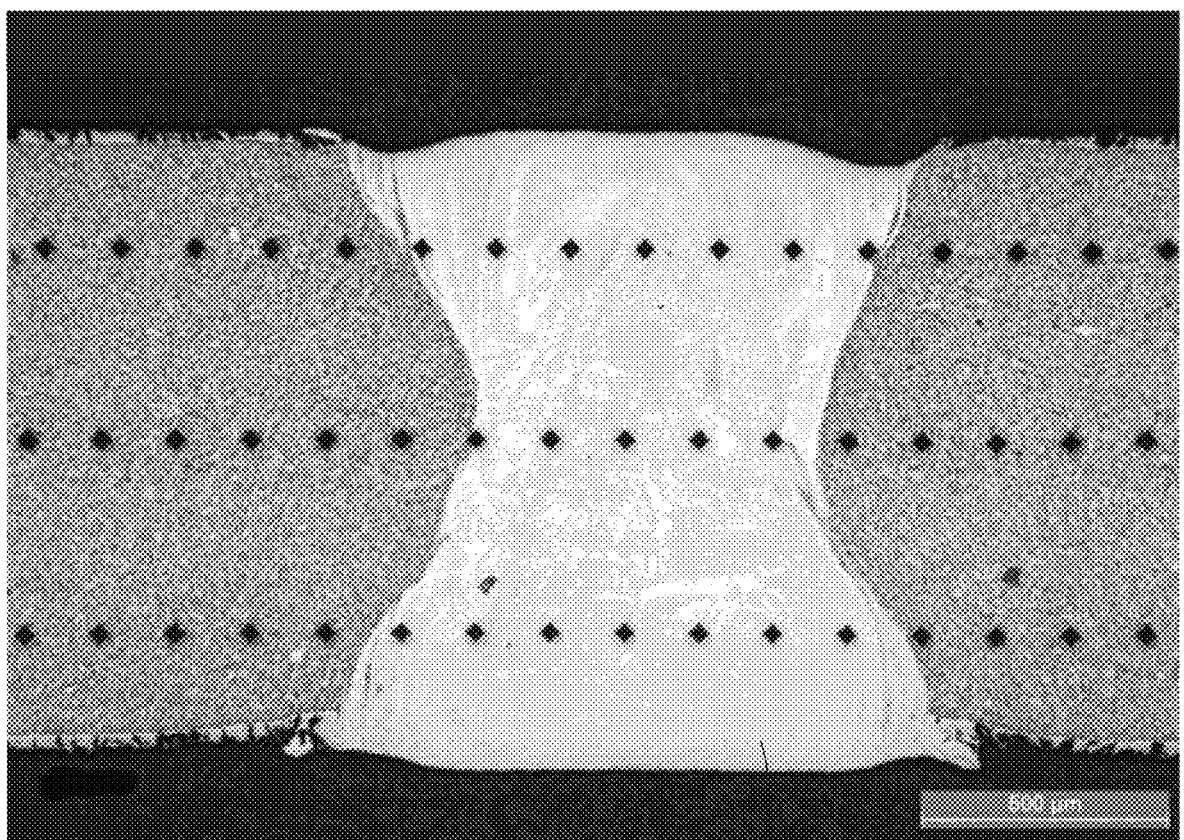
FIG. 5 is a schematic representation of the test locations used for hardness testing.

The hardness was measured using the Vickers hardness test according to the standard NF EN ISO 6507-1. The tests were performed transversely to the weld joint, using a test force of 0.5 kgf (HV0.5). The locations of the hardness measurement for each heat treated part are shown in FIG. 5. As can be seen from this figures, the hardness was measured along three lines located respectively at ¼, ½ and ¾ of the thickness of the heat treated part. For each line, measurements were taken with a regular step according to the standard NF EN ISO 6507-1, starting from the central axis of the weld joint 22.

The localization of the test points in the weld joint 22 or in the base metal was identified by metallographic examination of the test surface after Nital etching, which is a reagent known per se. The Heat Affected Zone was identified with the area including, over the three test lines, the two test points immediately adjacent to the weld joint 22.

The minimum hardness in the weld joint HV$_{min}$(WJ) corresponds to the lowest hardness value measured in the weld joint 22.

The maximum hardness in the weld joint HV$_{max}$(WJ) corresponds to the greatest hardness value measured in the weld joint 22.

The mean hardness in the weld joint HV$_{mean}$(WJ) corresponds to the mean of all the hardness values measured in the weld joint 22.

The minimum hardness in the Heat Affected Zone HV$_{min}$(HAZ) corresponds to the lowest hardness value measured in the Heat Affected Zone.

The mean hardness in the base metal HV$_{mean}$(BM) corresponds to the mean of all the hardness values measured in the base metal.

As can be seen from the above Table 6, in the experiments E1 to E8, in which the criteria C1 to C3 are satisfied, during tensile testing, 100% of the failures occurred outside of the weld joint 22 or the Heat Affected Zone.

Moreover:
the maximum hardness variation ΔHV(WJ) across the weld joint 22 is smaller than or equal to 20% of the mean hardness HV$_{mean}$(WJ) of the weld joint 22;
the minimum hardness HV$_{min}$(WJ) in the weld joint 22 is higher than or equal to the mean hardness HV$_{mean}$ (BM$_{least\ hardenable}$) of the least hardenable base metal; and
the hardness drop in the Heat Affected Zone relative to the base metal is smaller than or equal to 8%.

On the contrary, in the experiments E9 to E21, which are not according to the invention since at least one among criteria C1 to C3 is not fulfilled, the failures occur either in the weld joint 22 or in the Heat Affected Zone.

More particularly, when criterion C1 is not fulfilled, while the criteria C2 and C3 are fulfilled (experiments E13 to E19), the maximum hardness variation ΔHV(WJ) across the weld joint 22 is strictly greater than 20% of the mean hardness HV$_{mean}$(WJ) of the weld joint 22. Therefore, in this case, the weld joint 22 comprises localized hardness peak areas, which are therefore less ductile and increase the risk of a failure in the weld joint 22.

Furthermore, in the case where the criterion C2 is not fulfilled, while criteria C1 and C3 are satisfied (experiments E9 to E12), the minimum hardness $HV_{min}(WJ)$ in the weld joint 22 is strictly smaller than the mean hardness $HV_{mean}$ (BM least hardenable) of the least hardenable base metal. In this case, 100% of the failures occurred in the weld joint 22.

Finally, when criterion C3 is not fulfilled, while the criteria C1 and C2 are fulfilled (experiments E20 and E21), the hardness drop in the Heat Affected Zone relative to the base metal is strictly greater than 8%. In this case, at least 20% of the failures occurred in the Heat Affected Zone. These results confirm that the risk of failure in the Heat Affected Zone is increased when C3 is not fulfilled.

Furthermore, it is observed that, in the experiments in which the criterion C5 is fulfilled, the hardness variation within the weld joint ΔHV(WJ) is smaller than or equal to 80 HV (experiments E1 to E8 and E19 and E20), even if the carbon content in the weld joint 22 is greater than or equal to 0.15 wt. %. On the contrary, if the criterion C5 is not fulfilled, for carbon contents in the weld joint 22 greater than or equal to 0.15 wt. %, the hardness variation within the weld joint ΔHV(WJ) is strictly greater than 80 HV (experiments E10 to E18).

The method according to the present disclosure is therefore particularly advantageous, since it allows obtaining, after hot press-forming and cooling in the press tool, a part having excellent mechanical properties, including in the weld joint 22 and without having to remove the precoating 5 prior to welding.

It is therefore particularly well adapted for the fabrication of anti-intrusion parts, structural parts or energy-absorption parts that contribute to the safety of motor vehicles.

What is claimed is:

1. A method for producing a welded steel blank comprising the successive steps of:
   providing two precoated sheets, each precoated sheet comprising a steel substrate having a precoating on at least one of its main faces, the precoating comprising an intermetallic alloy layer comprising at least iron and aluminum, the steel substrate being made of a press-hardenable steel, for at least one of the precoated sheets, the steel of the steel substrate comprising, Fe and at least one of C, Mn, Si, Cr, Ti, Al, S, P and B; and
   butt welding the precoated sheets using a filler wire so as to form a weld joint at a junction between the precoated sheets, the precoating entirely covering at least one main face of each precoated sheet at a time of butt welding,
   the filler wire having a carbon content comprised between 0.01 wt. % and 0.45 wt. %,
   a composition of the filler wire and a proportion of filler wire added to a weld pool is chosen in such a manner that the thus obtained weld joint is characterized by:
   (a) a quenching factor $FT_{WJ}$ of the weld joint such that $FT_{WJ} - 0.9 FT_{BM} \geq 0$,
   where:
   $FT_{BM}$ is the quenching factor of a least hardenable steel substrate among the steel substrates of the two precoated sheets, and
   the quenching factors $FT_{WJ}$ and $FT_{BM}$ are determined using the following formula: $FT=128+1553 \times C+55 \times Mn+267 \times Si+49 \times Ni+5 \times Cr-79 \times Al-2 \times Ni^2-1532 \times C^2-5 \times Mn^2-127 \times Si^2-40 \times C \times Ni-4 \times Ni \times Mn$, where Al, Cr, Ni, C, Mn and Si are, respectively, a mean aluminum, chromium, nickel, carbon, manganese and silicon content, expressed in weight percent, of an area whose quenching factor is to be determined, this area being the weld joint in the case of $FT_{WJ}$ and the least hardenable steel substrate in the case of $FT_{BM}$, and
   (b) a carbon content $C_{WJ}$ of the weld joint strictly smaller than 0.15 wt. % or, if the carbon content $C_{WJ}$ of the weld joint is greater than or equal to 0.15 wt. %, a softening factor $FA_{WJ}$ of the weld joint such that $FA_{WJ} > 5000$, where the softening factor $FA_{WJ}$ of the weld joint is calculated as a function of a mean aluminum, chromium, nickel, molybdenum, carbon, manganese and silicon content of the weld joint, expressed in weight percent, using the following formula:

$FA = 10291 + 4384.1 \times Mo + 3676.9 Si - 522.64 \times Al - 2221.2 \times Cr - 118.11 \times Ni - 1565.1 \times C - 246.67 \times Mn$.

2. The method as recited in claim 1, wherein each of the steel substrates has a thickness comprised between 0.8 mm and 5 mm, and for at least one of the precoated sheets, the steel of the steel substrate comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ a rest being iron and impurities resulting from manufacturing.

3. The method as recited in claim 1, wherein, for each of the precoated sheets, the steel of the steel substrate comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ a rest being iron and impurities resulting from manufacturing.

4. The method as recited in claim 1, wherein the precoating further comprises a metallic alloy layer extending atop the intermetallic alloy layer, the metallic alloy layer being a layer of aluminum, a layer of aluminum alloy or a layer of aluminum-based alloy.

5. The method as recited in claim 1, wherein the carbon content $C_{WJ}$, in weight percent, of the weld joint is such that $1.25 \times C_{BM(most\ hardenable)} - C_{WJ} \geq 0$, where $C_{BM}$ is the carbon content, in weight percent, of a most hardenable steel substrate among the steel substrates of the two precoated sheets.

6. The method as recited in claim 1, wherein a nickel content $Ni_{WJ}$ of the weld joint is comprised between 2.0 wt. % and 11.0 wt. %.

7. The method as recited in claim 1, wherein the carbon content $C_{WJ}$, in weight percent, of the weld joint is such that $1.25 \times C_{BM(most\ hardenable)} - C_{WJ} \geq 0$, where $C_{BM}$ is the carbon content, in weight percent, of a most hardenable steel substrate among the steel substrates of the two precoated sheets, a nickel content $Ni_{WJ}$ of the weld joint being comprised between 2.0 wt. % and 11.0 wt. %.

8. The method as recited in claim 1, wherein the precoated sheets provided in the providing step each have the precoating on both of their main faces.

9. The method as recited in claim 8, wherein, at the time of butt welding, the precoating remains integrally on both main faces of at least one of the precoated sheets.

10. The method as recited in claim 1, further comprising, prior to butt welding, preparing a weld edge of at least one of the precoated sheets for incorporating at least partially into the weld joint, using at least one of the following processing steps:
   brushing, machining, chamfering, bevelling and/or removing at least a portion of the precoating,
   the preparation being performed in such a manner that the precoating remains integrally on at least one main face of each of the two precoated sheets.

11. The method as recited in claim 1, wherein the welding step is performed exclusively using a laser beam.

12. The method as recited in claim 1, wherein, for at least one of the precoated sheets, the steel of the steel substrate comprises, by weight:

$0.15\% \leq C \leq 0.25\%$ $0.8\% \leq Mn \leq 1.8\%$ $0.1\% \leq Si \leq 0.35\%$ $0.01\% \leq Cr \leq 0.5\%$ $Ti \leq 0.1\%$ $Al \leq 0.1\%$ $S \leq 0.05\%$ $P \leq 30.1\%$ $B \leq 0.005\%$ a rest being iron and impurities resulting from manufacturing.

13. The method as recited in claim 1, wherein, for at least one of the precoated sheets, the steel of the steel substrate comprises, by weight:

$0.24\% \leq C \leq 0.38\%$ $0.40\% \leq Mn \leq 3\%$ $0.10\% \leq Si \leq 0.70\%$ $0.015\% \leq Al \leq 0.070\%$ $0\% \leq Cr \leq 2\%$ $0.25\% \leq Ni \leq 2\%$ $0.015\% \leq Ti \leq 0.10\%$ $0\% \leq Nb \leq 0.060\%$ $0.0005\% \leq B \leq 0.0040\%$ $0.003\% \leq N \leq 0.010\%$ $0.0001\% \leq S \leq 0.005\%$ $0.0001\% \leq P \leq 0.025\%$ wherein the titanium and nitrogen contents satisfy the following relationship:

$Ti/N > 3.42$.

and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:

$0.05\% \leq Mo \leq 0.65\%$ $0.001\% \leq W \leq 0.30\%\%$ $0.0005\% \leq Ca \leq 0.005\%$ a rest being iron and impurities resulting from manufacturing.

14. The method as recited in claim 1, wherein the welding is performed using a protection gas.

15. The method as recited in claim 14, wherein the protection gas is helium and/or argon.

16. A method for producing a welded and thereafter hot press-formed and cooled steel part comprising the successive steps of:
   carrying out the method as recited in claim 1 in order to obtain the welded steel blank;
   heating the welded steel blank so as to obtain a fully austenitic structure in the steel substrates of the precoated sheets;
   hot press-forming the welded steel blank in a press tool to obtain a steel part; and
   cooling the steel part in the press tool.

17. The method according to claim 16, wherein, during the cooling step, a cooling rate is greater than or equal to a bainitic or martensitic cooling rate of a most hardenable among the steel substrates of the precoated sheets.

18. A welded steel blank comprising:
   two precoated sheets, each precoated sheet comprising a steel substrate having a precoating on at least one of its main faces, the precoating comprising an intermetallic alloy layer comprising at least iron and aluminum, the steel substrate being made of a press-hardenable steel,
   for at least one of the precoated sheets, the steel of the steel substrate comprising, Fe and at least one of C, Mn, Si, Cr, Ti, Al, S, P and B, and
   the precoated sheets being joined by a weld joint, the weld joint being characterized by:
   (a) a quenching factor $FT_{WJ}$ of the weld joint such that $FT_{WJ} - 0.9 FT_{BM} \geq 0$, where:
- $FT_{BM}$ is the quenching factor of a least hardenable steel substrate among the steel substrates of the two precoated sheets, and
- the quenching factors $FT_{WJ}$ and $FT_{BM}$ are determined using the following formula: $FT=128+1553\times C+55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, where Al, Cr, Ni, C, Mn and Si are, respectively, a mean aluminum, chromium, nickel, carbon, manganese and silicon content, expressed in weight percent, of an area whose quenching factor is to be determined, this area being the weld joint in the case of $FT_{WJ}$ and the least hardenable steel substrate in the case of $FT_{BM}$, and (b) a carbon content $C_{WJ}$ of the weld joint strictly smaller than 0.15 wt. % or, if the carbon content $C_{WJ}$ of the weld joint is greater than or equal to 0.15 wt. %, a softening factor $FA_{WJ}$ of the weld joint such that $FA_{WJ}>5000$, where the softening factor $FA_{WJ}$ of the weld joint is calculated as a function of a mean aluminum, chromium, nickel, molybdenum, carbon, manganese and silicon content of the weld joint, expressed in weight percent, using the following formula:

$FA=10291+4384.1\times Mo+3676.9Si-522.64\times Al-2221.2\times Cr-118.11\times Ni-1565.1\times C-246.67\times Mn$, and the weld joint is such that, after hot press-forming and cooling, a maximum hardness variation $\Delta HV(WJ)$ across the weld joint is smaller than or equal to 20% of a mean hardness $HV_{mean}(WJ)$ of the weld joint.

19. The welded steel blank as recited in claim 18, wherein each of the steel substrates has a thickness comprised between 0.8 mm and 5 mm, and for at least one of the precoated sheets, the steel of the steel substrate comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ a rest being iron and impurities resulting from manufacturing.

20. The welded steel blank as recited in claim 18, wherein, for each of the precoated sheets, the steel of the steel substrate comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ a rest being iron and impurities resulting from manufacturing.

21. The welded steel blank as recited in claim 18, wherein the precoating further comprises a metallic alloy layer extending atop the intermetallic alloy layer, the metallic alloy layer being a layer of aluminum, a layer of aluminum alloy or a layer of aluminum-based alloy.

22. The welded steel blank as recited in claim 18, wherein the carbon content CWJ, in weight percent, of the weld joint is such that $1.25\times C_{BM(most\ hardenable)}-C_{WJ}\geq 0$, where $C_{BM}$ is the carbon content, in weight percent, of a most hardenable steel substrate among the steel substrates of the two precoated sheets.

23. The welded steel blank as recited in claim 18, wherein a nickel content $Ni_{WJ}$ of the weld joint is comprised between 2.0 wt. % and 11.0 wt. %.

24. The welded steel blank as recited in claim 18, wherein the carbon content CWJ, in weight percent, of the weld joint is such that $1.25\times C_{BM(most\ hardenable)}-C_{WJ}\geq 0$, where $C_{BM}$ is the carbon content, in weight percent, of a most hardenable steel substrate among the steel substrates of the two precoated sheets, a nickel content $Ni_{WJ}$ of the weld joint being comprised between 2.0 wt. % and 11.0 wt. %.

25. The welded steel blank as recited in claim 18, wherein the weld joint is obtained exclusively through laser welding.

26. The welded steel blank as recited in claim 18, wherein for at least one of the precoated sheets, the steel of the steel substrate comprises, by weight:

$0.15\% \leq C \leq 0.25\%$ $0.8\% \leq Mn \leq 1.8\%$ $0.1\% \leq Si \leq 0.35\%$ $0.01\% \leq Cr \leq 0.5\%$ $Ti \leq 0.1\%$ $Al \leq 0.1\%$ $S \leq 0.05\%$ $P \leq 0.1\%$ $B \leq 0.005\%$ a rest being iron and impurities resulting from manufacturing.

27. The welded steel blank as recited in claim 18, wherein for one of the precoated sheets, the steel of the steel substrate comprises, by weight:

$0.24\% \leq C \leq 0.38\%$ $0.40\% \leq Mn \leq 3\%$ $0.10\% \leq Si \leq 0.70\%$ $0.015\% \leq Al \leq 0.070\%$ $0\% \leq Cr \leq 2\%$ $0.25\% \leq Ni \leq 2\%$ 0.015% ≤ Ti ≤ 0.10%

0% ≤ Nb ≤ 0.060%

0.0005% ≤ B ≤ 0.0040%

0.003% ≤ N ≤ 0.010%

0.0001% ≤ S ≤ 0.005%

0.0001% ≤ P ≤ 0.025% wherein the titanium and nitrogen contents satisfy the following relationship:

Ti/N > 3.42.

and the carbon, manganese, chromium and silicon contents satisfy the following relationship:

$$2.6C + \frac{Mn}{5.3} + \frac{Cr}{13} + \frac{Si}{15} \geq 1.1\%,$$

the steel optionally comprising one or more of the following elements:

0.05% ≤ Mo ≤ 0.65%

0.001% ≤ W ≤ 0.30%%

0.0005% ≤ Ca ≤ 0.005% a rest being iron and impurities resulting from manufacturing; and wherein for the other of the precoated sheets, the steel of the steel substrate comprises, by weight:

0.10% ≤ C ≤ 0.5%

0.5% ≤ Mn ≤ 3%

0.1% ≤ Si ≤ 1%

0.01% ≤ Cr ≤ 1%

Ti ≤ 0.2%

Al ≤ 0.1%

S ≤ 0.05%

P ≤ 0.1%

B ≤ 0.010% a rest being iron and impurities resulting from manufacturing.

28. A welded, hot press-formed and cooled steel part comprising:
a first coated steel part portion; and
a second coated steel part portion,
each coated steel part portion comprising a steel substrate having, on at least one of its main faces, a coating comprising at least iron and aluminum, the steel substrate being made of a press-hardenable steel,
the steel of the steel substrate of at least one among the first and the second coated steel part portions comprising Fe and at least one of C, Mn, Si, Cr, Ti, Al, S, P and B, and
and the first and second coated steel part portions being joined by a weld joint, the weld joint being characterized by:

(a) a quenching factor $FT_{WJ}$ of the weld joint such that $FT_{WJ} - 0.9 FT_{BM} \geq 0$,
where:
$FT_{BM}$ is the quenching factor of a least hardenable steel substrate among the steel substrates of the two coated steel part portions, and
the quenching factors $FT_{WJ}$ and $FT_{BM}$ are determined using the following formula: $FT = 128 + 1553 \times C + 55 \times Mn + 267 \times Si + 49 \times Ni + 5 \times Cr - 79 \times Al - 2 \times Ni^2 - 1532 \times C^2 - 5 \times Mn^2 - 127 \times Si^2 - 40 \times C \times Ni - 4 \times Ni \times Mn$, where Al, Cr, Ni, C, Mn and Si are, respectively, a mean aluminum, chromium, nickel, carbon, manganese and silicon content, expressed in weight percent, of an area whose quenching factor is to be determined, this area being the weld joint in the case of $FT_{WJ}$ and the least hardenable steel substrate in the case of $FT_{BM}$, and (b) a carbon content $C_{WJ}$ of the weld joint strictly smaller than 0.15 wt. % or, if the carbon content $C_{WJ}$ of the weld joint is greater than or equal to 0.15 wt. %, a softening factor $FA_{WJ}$ of the weld joint such that $FA_{WJ} > 5000$, where the softening factor $FA_{WJ}$ of the wed joint is calculated as a function of a mean aluminum, chromium, nickel, molybdenum, carbon, manganese and silicon content of the weld joint, expressed in weight percent, using the following formula:

$FA = 10291 + 4384.1 \times Mo + 3676.9 Si - 522.64 \times Al - 2221.2 \times Cr - 118.11 \times Ni - 1565.1 \times C - 246.67 \times Mn$ and a maximum hardness variation $\Delta HV(WJ)$ across the weld joint is smaller than or equal to 20% of a mean hardness $HV_{mean}(WJ)$ of the weld joint.

29. The welded, hot press-formed and cooled steel part as recited in claim 28, wherein each of the steel substrates has a thickness comprised between 0.8 mm and 5 mm, and the steel of the steel substrate of at least one among the first and the second coated steel part portions comprises, by weight:

0.10% ≤ C ≤ 0.5%

0.5% ≤ Mn ≤ 3%

0.1% ≤ Si ≤ 1%

0.01% ≤ Cr ≤ 1%

Ti ≤ 0.2%

Al ≤ 0.1%

S ≤ 0.05%

P ≤ 0.1%

B ≤ 0.010% a rest being iron and impurities resulting from manufacturing.

30. The welded, hot press-formed and cooled steel part as recited in claim 28, wherein, the steel of the steel substrate of at least one among the first and the second coated steel part portions comprises, by weight:

0.10% ≤ C ≤ 0.5%

0.5% ≤ Mn ≤ 3%

0.1% ≤ Si ≤ 1%

0.01% ≤ Cr ≤ 1%

Ti≤0.2%

Al≤0.1%

S≤0.05%

P≤0.1%

B≤0.010% a rest being iron and impurities resulting from manufacturing.

31. The welded, hot press-formed and cooled steel part as recited in claim 28, wherein a hardness drop in a Heat Affected Zone relative to a base metal of the first and second coated steel part portions adjacent thereto is smaller than or equal to 8%.

32. The welded, hot press-formed and cooled steel part as recited in claim 28, wherein the mean hardness $HV_{mean}$ (WJ) in the weld joint is smaller than or equal to 600 HV.

33. The welded, hot press-formed and cooled steel part as recited in claim 28, wherein the carbon content $C_{WJ}$, in weight percent, in the weld joint is such that $1.25 \times C_{BM} - C_{WJ} \geq 0$, where $C_{BM}$ is the carbon content, in weight percent, of a most hardenable steel substrate among the steel substrates of the first and second coated steel part portions.

34. The welded, hot press-formed and cooled steel part as recited in claim 28, wherein a nickel content $Ni_{WJ}$ in the weld joint is comprised between 2.0 wt. % and 11.0 wt. %.

35. The welded, hot press-formed and cooled steel part as recited in claim 28, wherein the carbon content $C_{WJ}$, in weight percent, in the weld joint is such that $1.25 \times C_{BM} - C_{WJ} \geq 0$, where $C_{BM}$ is the carbon content, in weight percent, of a most hardenable steel substrate among the steel substrates of the first and second coated steel part portions, the nickel content $Ni_{WJ}$ in the weld joint being comprised between 2.0 wt. % and 11.0 wt. %.

36. The welded, hot press-formed and cooled steel part as recited in claim 28, wherein, the steel of the steel substrate of at least one among the first and the second coated steel part portions comprises, by weight:

0.15%≤C≤0.25%

0.8%≤Mn≤1.8%

0.1%≤Si≤0.35%

0.01%≤Cr≤0.5%

Ti≤0.1%

Al≤0.1%

S≤0.05%

P≤0.1%

B≤0.005% a rest being iron and impurities resulting from manufacturing.

37. The welded, hot press-formed and cooled steel part as recited in claim 28, wherein the steel of the steel substrate of at least one among the first and the second coated steel part portions comprises, by weight:

0.24%≤C≤0.38%

0.40%≤Mn≤3%

0.10%≤Si≤0.70%

0.015%≤Al≤0.070%

0%≤Cr≤2%

0.25%≤Ni≤2%

0.015%≤Ti≤0.10%

0%≤Nb≤0.060%

0.0005%≤B≤0.0040%

0.003%≤N≤0.010%

0.0001%≤S≤0.005%

0.0001%≤P≤0.025% wherein the titanium and nitrogen contents satisfy the following relationship:

Ti/N>3.42.

and the carbon, manganese, chromium and silicon contents satisfy the following relationship $$2.6C + \frac{Mn}{5.3} + \frac{Cr}{13} + \frac{Si}{15} \geq 1.1\%,$$

the steel optionally comprising one or more of the following elements:

0.05%≤Mo≤0.65%

0.001%≤W≤0.30%

0.0005%≤Ca≤0.005% a rest being iron and impurities resulting from manufacturing.

38. A method of producing a motor vehicle part comprising:
producing an anti-intrusion part or an energy-absorption part for a motor vehicle using the welded, hot press-formed and cooled steel part according to claim 28.

* * * * *